United States Patent
Akita

(10) Patent No.: US 8,310,915 B2
(45) Date of Patent: Nov. 13, 2012

(54) METHOD OF TRANSMITTING OFDM SIGNAL AND TRANSMITTER AND RECEIVER THEREOF

(75) Inventor: Koji Akita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 415 days.

(21) Appl. No.: 11/619,328

(22) Filed: Jan. 3, 2007

(65) Prior Publication Data

US 2007/0165514 A1 Jul. 19, 2007

Related U.S. Application Data

(63) Continuation of application No. PCT/JP2006/319826, filed on Sep. 27, 2006.

(30) Foreign Application Priority Data

Jan. 16, 2006 (JP) .................................. 2006-007918

(51) Int. Cl.
H04J 11/00 (2006.01)

(52) U.S. Cl. ........................................ 370/203; 375/267

(58) Field of Classification Search .................. 375/260, 375/267; 455/442, 522
See application file for complete search history.

(56) References Cited

U.S. PATENT DOCUMENTS

| | | | | |
|---|---|---|---|---|
| 7,286,508 B2 * | 10/2007 | Abeta et al. | ..................... | 370/335 |
| 7,324,609 B1 * | 1/2008 | Hwang et al. | .................. | 375/319 |
| 2002/0122381 A1 | 9/2002 | Wu et al. | | |
| 2004/0131007 A1 * | 7/2004 | Smee et al. | ..................... | 370/208 |
| 2005/0020215 A1 * | 1/2005 | Hottinen | ........................ | 455/101 |
| 2006/0013325 A1 * | 1/2006 | Agrawal et al. | ............... | 375/260 |
| 2006/0067277 A1 * | 3/2006 | Thomas et al. | ................ | 370/334 |
| 2008/0125109 A1 * | 5/2008 | Larsson et al. | ................. | 455/424 |
| 2009/0129334 A1 * | 5/2009 | Ma et al. | ........................ | 370/331 |

FOREIGN PATENT DOCUMENTS

| | | |
|---|---|---|
| EP | 1 566 936 A1 | 8/2005 |
| WO | WO 2004/019538 A2 | 3/2004 |
| WO | WO 2004/064295 A2 | 7/2004 |

OTHER PUBLICATIONS

Taylor, Robert and Withers Jr., Lang. Echo-Mimo: a Two-Way Channel Training Method for Matched Cooperative Beamforming. Conference Record of the 39th Asilomar Conference on Signals, Systems and Computers. Oct. 28-Nov. 1, 2005.*
LG Electronics, "MBMS transmission in E-Utra", http://www.3gpp.org/ftp/tsa-ran/WG1-RL1/TSGR1-43/Docs/R1-051300.zip, Dec. 20, 2005.
U.S. Appl. No. 11/776,573, filed Jul. 12, 2007, Akita.
U.S. Appl. No. 11/776,576, filed Jul. 12, 2007, Akita, et al.

* cited by examiner

*Primary Examiner* — Kibrom T Hailu
*Assistant Examiner* — Benjamin Lamont
(74) *Attorney, Agent, or Firm* — Oblon, Spivak, McClelland, Maier & Neustadt, L.L.P.

(57) ABSTRACT

An OFDM transmitter includes, an allocation unit configured to allocate a first pilot signal and a first data signal respectively to at least one first pilot subcarrier and first data subcarriers within a subcarrier group that is identical among transmitters, and to allocate a second pilot signal and a second data signal respectively to at least one second pilot subcarrier and second data subcarriers outside the subcarrier group, a multiplier to multiply the first pilot signal and the first data signal by complex numbers set for the subcarriers, a modulator to subject the first pilot signal and the first data signal multiplied by the complex numbers and the second pilot signal and the second data signal to OFDM modulation in order to generate an OFDM signal, and a transmission unit configured to transmit the generated OFDM signal.

18 Claims, 11 Drawing Sheets

METHOD OF TRANSMITTING OFDM SIGNAL AND TRANSMITTER AND RECEIVER THEREOF

CROSS-REFERENCE TO RELATED APPLICATIONS

This is a Continuation Application of PCT Application No. PCT/JP2006/319826, filed Sep. 27, 2006, which was published under PCT Article 21(2) in English.

This application is based upon and claims the benefit of priority from prior Japanese Patent Application No. 2006-007918, filed Jan. 16, 2006, the entire contents of which are incorporated herein by reference.

BACKGROUND OF THE INVENTION

1. Field of the Invention

The present invention relates to a method of transmitting an orthogonal frequency division multiplexing (OFDM) signal and a transmitter and receiver thereof.

2. Description of the Related Art

A macro diversity reception technique is known as one of the techniques for reception in a wireless communication system. In macro diversity, the same pilot signal and the same data signal are transmitted from a plurality of transmitters by the same carrier frequency. Such signals transmitted from each transmitter are received and combined at a receiver to obtain a predetermined gain. R1-051300, "MBMS transmission in E-UTRA", LG Electronics, 3GPP TSG RAN WG1#43, Nov. 7-11, 2005 discloses a frame structure for performing macro diversity in an OFDM wireless communication system where signals that adapt and do not adapt macro diversity reception coexist. In the frame structure the pilot signals are scrambled using a scrambling pattern set for each transmitter. Data signals are not scrambled. The scrambling patterns are set so as to establish an orthogonal or pseudo orthogonal relation with respect to each other. According to this frame structure, since the pilot signal transmitted from a certain transmitter is in an orthogonal or pseudo orthogonal relation with signals transmitted from other transmitters, the receiver side is able to separate the signal transmitted from the certain transmitter from the signals from other transmitters. Accordingly, the pilot signal can be used for channel estimation of signals which do not adapt macro diversity reception.

To perform macro diversity reception for the signals transmitted in the frame structure, a two-step process is required at the receiver. In the first step, each channel response from each transmitter to receiver is estimated individually using the orthogonal or pseudo orthogonal relation. In the second step, the sum of each individually estimated channel response is used to compensate channel distortion of the received data signal by equalization, i.e. channel equalization. In this manner, channel equalization can be carried out for data signals arriving from each transmitter via each channel to the receiver.

For the receiver side to perform macro diversity reception for the signals of the frame structure, it is necessary to estimate each channel response from each transmitter to receiver individually. Originally, only the sum of each channel response is required for channel equalization in macro diversity reception. However, in the frame structure, it is necessary to obtain each channel response individually for channel equalization, which, consequently, increases the calculation amount.

Meanwhile, in the process of estimating each channel response individually, a desired channel response can be taken out alone by canceling out the other channels using the orthogonal or pseudo orthogonal relation. However, in some cases, channel distortion may weaken the orthogonality or the pseudo orthogonality, and the effectiveness to cancel out other channel responses may be reduced. In such case, the other channel responses are subject to complex addition as interference on the desired channel response, deteriorating accurate estimation of the desired channel response.

Further, in the process of estimating each channel response individually, the receiver is required to recognize all scrambling patterns included in the received signal. In the case where the receiver does not recognize a part of the scrambling pattern, the receiver will not be able to estimate the channel response from the transmitter to the receiver, and the reception performance deteriorates. Moreover, when the receiver recognizes a scrambling pattern not included in the received signal by mistake, the estimate value of a channel response generated by such scrambling pattern only includes interference. Thus, again, the reception performance deteriorates. For the receiver side to recognize the scrambling pattern, it is necessary to control information on which signal corresponding to which scrambling pattern is being received at the receiver side. Therefore, the control of the receiving side becomes complicated.

BRIEF SUMMARY OF THE INVENTION

According to a first aspect of the present invention, a method of transmitting orthogonal frequency division multiplexing (OFDM) signals from a plurality of transmitters, comprising; allocating a first pilot signal and a first data signal respectively to at least one first pilot subcarrier and first data subcarriers within a subcarrier group that is identical among the transmitters; allocating a second pilot signal and a second data signal respectively to at least one second pilot subcarrier and second data subcarriers outside the subcarrier group; multiplying the first pilot signal and the first data signal by a complex number set for the subcarrier group; generating an OFDM signal by performing OFDM modulation on the first pilot signal and the first data signal multiplied by the complex number and the second pilot signal and the second data signal; and transmitting the OFDM signal is provided.

According to a second aspect of the present invention, an OFDM transmitter transmitting OFDM signals comprising; an allocation unit configured to allocate a first pilot signal and a first data signal respectively to at least one first pilot subcarrier and first data subcarriers within a subcarrier group that is identical among the transmitters, and to allocate a second pilot signal and a second data signal respectively to at least one second pilot subcarrier and the second data subcarriers outside the subcarrier group; a multiplier configured to multiply the first pilot signal and the first data signal by a complex number set for the subcarrier group; a modulator configure to generate an OFDM signal by performing OFDM modulation on the first pilot signal and the first data signal multiplied by the complex number and the second pilot signal and the second data signal; and a transmission unit configured to transmit the generated OFDM signal is provided.

According to a third aspect of the present invention, an OFDM receiver receiving OFDM signals, an OFDM demodulator configured to subject the OFDM signal to OFDM demodulation to divide the received OFDM signal into a plurality of signals corresponding to respective subcarriers; a separator configured to separate from a signal of each of the subcarriers a first pilot signal and a first data signal allocated respectively to at least one first pilot subcarrier and first data subcarriers included in at least one subcarrier group; an estimation unit configured to estimate channel response using the first pilot signal separated by the separator; an equalizer configured to equalize the separated first data signal in accordance with the channel response estimated by the estimation unit; and a data demodulator configured to demodulate the first data signal equalized by the equalizer is provided.

According to a fourth aspect of the present invention, an OFDM receiver receiving OFDM signals, comprising; an OFDM demodulator configured to subject an OFDM signal to OFDM demodulation to divide a received OFDM signal into a plurality of signals corresponding to respective subcarriers; a separator configured to separate from a signal of each of the subcarriers a first pilot signal allocated to at least one first pilot subcarrier included in at least one subcarrier group, the first data signal allocated to first data subcarriers included in the subcarrier group, a second pilot signal allocated to the second pilot subcarriers outside the subcarrier group, and a second data signal allocated to the second data subcarriers outside the subcarrier group; a first estimation unit configured to estimate a first channel response using the separated first pilot signal; a first equalizer configured to equalize the separated first data signal in accordance with the estimated first channel response; a descrambler configured to descramble the separated second pilot signal and the second data signal; a second estimation unit configured to estimate a second channel response using the descrambled second pilot signal; a second equalizer configured to equalize the descrambled second data signal in accordance with the estimated second channel response; and a data demodulator configured to demodulate the equalized first data signal and the equalized second data signal is provided.

DETAILED DESCRIPTION OF THE INVENTION

Figure 1:
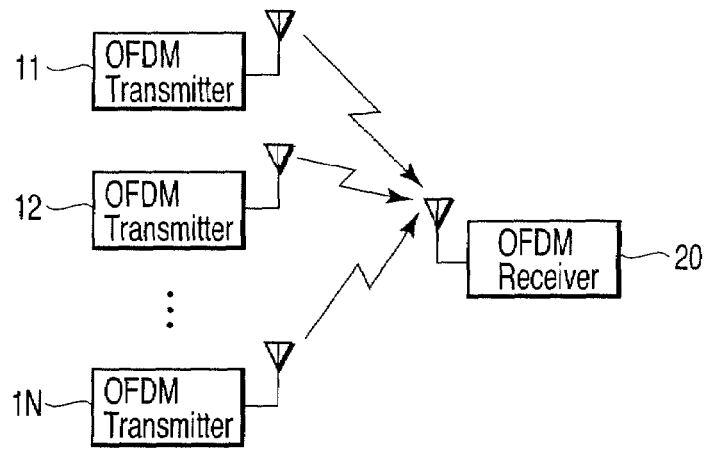
FIG. 1 is a schematic view of an OFDM wireless system according to an embodiment.

As shown in FIG. 1, the wireless communication system according to a first embodiment of the present invention includes a plurality (N) of OFDM transmitters 11, 12, ..., 1N and an OFDM receiver 20 which receives OFDM signals transmitted from each OFDM transmitter 11, 12, ..., 1N via different channel propagation paths. Each of the OFDM transmitters 11, 12, ..., 1N transmits OFDM signals. The OFDM transmitters 11, 12, ..., 1N need not necessarily be placed in different places from one another. Therefore, some of them may be placed in the same place. For example, two of the OFDM transmitters may be included in one wireless communication apparatus. In such case, common components among the transmitters, such as a subcarrier allocation unit and subcarrier group setting unit, which are a part of the components in the OFDM transmitter, may be shared among a plurality of OFDM transmitters. The subcarrier allocation unit and subcarrier group setting unit will be explained later.

Figure 2:
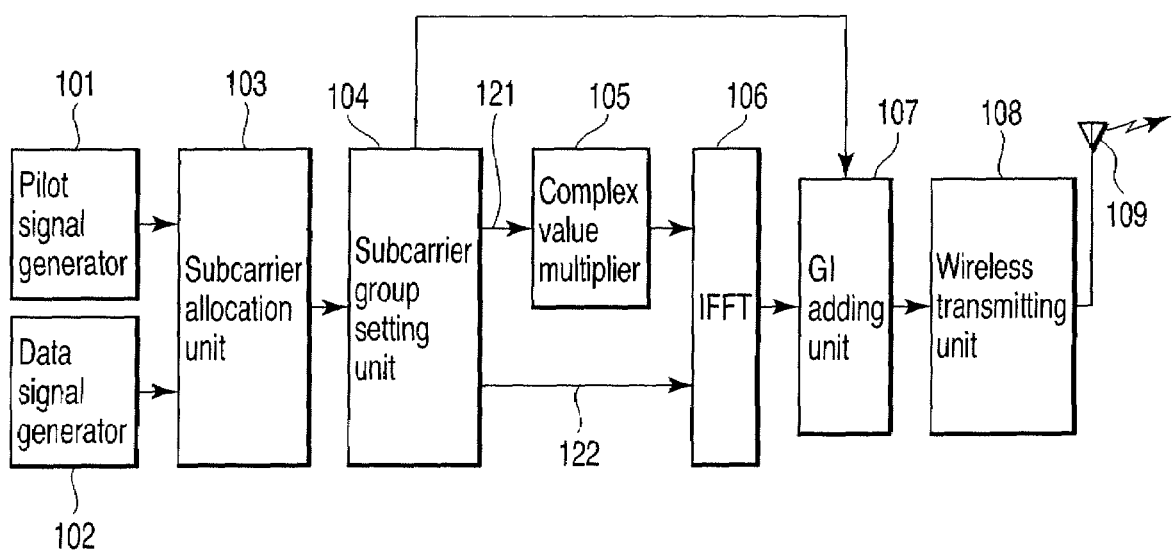
FIG. 2 is a block diagram showing an example of an OFDM transmitter in FIG. 1.
Figure 3:
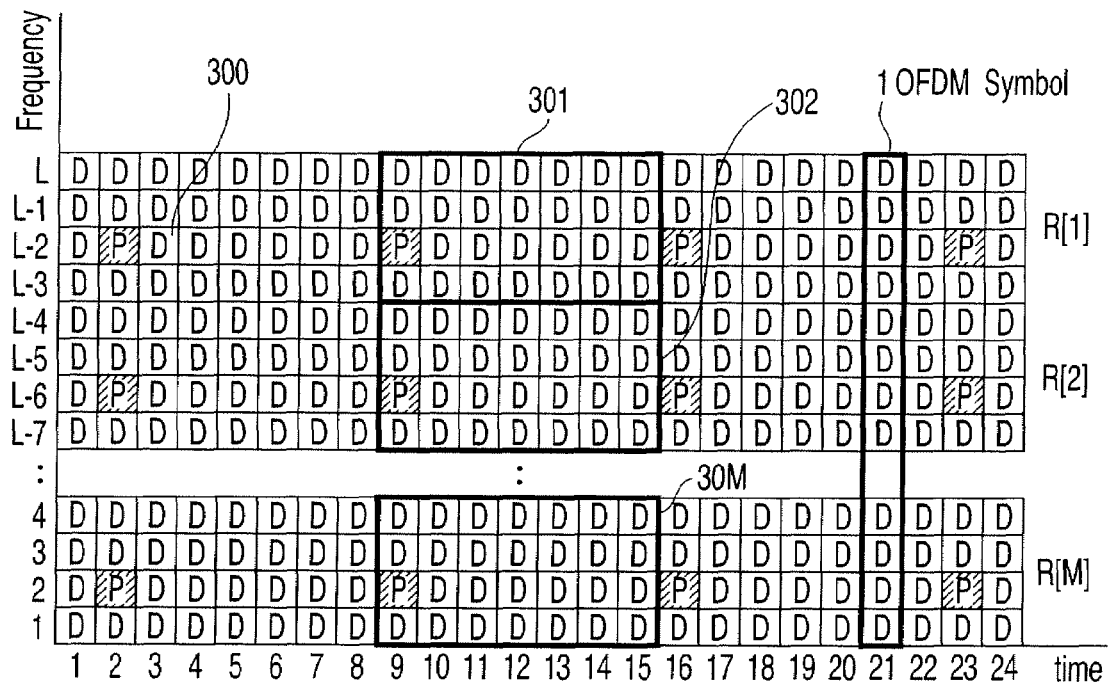
FIG. 3 illustrates the setting of subcarrier allocation and subcarrier group in the OFDM transmitter.

FIG. 2 shows the structure of an OFDM transmitter. FIG. 3 shows the aspects of a subcarrier allocation unit 103 allocating subcarriers and a subcarrier setting unit 104 setting subcarrier groups. In FIG. 3, OFDM symbols are arranged along a horizontal time axis, and a plurality of subcarriers forming each OFDM symbol is arranged along a vertical frequency axis. 1, 2, ..., M specified along the frequency axis represent subcarrier numbers. 1, 2, ..., specified along the time axis represent OFDM symbol numbers.

In FIG. 2, a pilot signal generator 101 generates a pilot signal by subjecting a bit string which is the source of the pilot signal to digital modulation, such as quadrature phase shift keying (QPSK). Similarly, a data signal generator 102 generates a data signal by subjecting a bit string which is the source of the data signal to digital modulation such as QPSK. Both the pilot signal and data signal are shown in complex numbers. Further, the pilot signal is used, for example, for channel estimation (estimating channel response). The pilot signal can also be used for timing synchronization or frequency synchronization. The following embodiment explains the case of using the pilot signal for channel estimation.

The generated pilot signal and data signal are allocated to each corresponding subcarrier, i.e. to pilot subcarriers and data subcarriers, by the subcarrier allocation unit 103. To "allocate a signal to a subcarrier" means to add a subcarrier index to the signals shown in complex numbers. The subcarrier index represents the position of the corresponding subcarrier on the time axis and frequency axis. For example, a subcarrier index (3, L-2) is added to a data signal 300 in FIG. 3.

The pilot signal and data signal each allocated to the pilot subcarriers and data subcarriers by the subcarrier allocation unit 103 is input to the subcarrier group setting unit 104. The subcarrier group setting unit 104 sets up at least one subcarrier group including at least one or more pilot subcarriers to which the pilot signals are allocated and one or more data subcarriers to which the data signals are allocated. In the example of FIG. 3, a plurality (M) of subcarrier groups 301, 302, . . . , 30M are set. To "set a subcarrier group" means to add an index (referred to as group index) to the pilot signals and data signals to which the subcarrier indexes are added. The group index is not added to signals which do not belong to any subcarrier group.

Here, the subcarrier group setting unit 104 sets up at least one subcarrier group identical among the transmitters for the OFDM transmitters 11, 12, . . . , 1N in FIG. 1. In other words, at least one subcarrier group set up by each of the subcarrier setting units 104 in the OFDM transmitters 11, 12, . . . , 1N is in common. In the common subcarrier group, the pilot signals and data signals common to each OFDM transmitter 11, 12, . . . , 1N are allocated to the pilot subcarriers and data subcarriers respectively.

A signal 121 to which the subcarrier group setting unit 104 has set up the subcarrier group, i.e., the pilot signal (a first pilot signal) and data signal (a first data signal) to which group indexes have been added, is input to an inverse fast Fourier transformation (IFFT) unit 106, which is an OFDM modulator, via a complex numbers multiplier 105. A signal 122 to which the subcarrier group has not been set up, i.e., the pilot signal (a second pilot signal) and data signal (a second data signal) to which the group indexes are not added, is input directly to an IFFT unit 106.

The complex numbers multiplier 105 multiplies the pilot signal and data signal, to which group indexes are added, by complex numbers or sequence of complex numbers given to each pilot signal and data signal in equivalent group indexes. In the example of FIG. 3, each of the subcarrier groups 301, 302, . . . , 30M is multiplied respectively by one complex number R [1], R[2], . . . , R[M]. The complex numbers given to each subcarrier group may all have the same absolute value. By doing so, the occurrence of electric power differences can be circumvented among the subcarrier groups. Here, the complex numbers comprise a real value, which can be, for example, ±1. The pilot signal and data signal multiplied by the complex numbers are input to the IFFT unit 106.

The IFFT unit 106 generates an OFDM signal which is the sequence of a plurality of OFDM symbols by subjecting the signals input from the subcarrier group setting unit 104 and the complex numbers multiplier 105 to OFDM modulation. In other words, the IFFT unit 106 generates the OFDM signal by converting the signal of a frequency domain to the signal of a time domain. The generated OFDM signal is appended a guard interval (GI) by a GI adding unit 107, converted into a radio frequency (RF) signal by a wireless transmitting unit 108 which includes, for example, a digital to analog converter, an up-converter and a power amplifier, and transmitted from an antenna 109. The length of the guard interval added by the GI adding unit 107 is set in accordance with the instruction from the subcarrier group setting unit 104, as described later.

Figure 4:
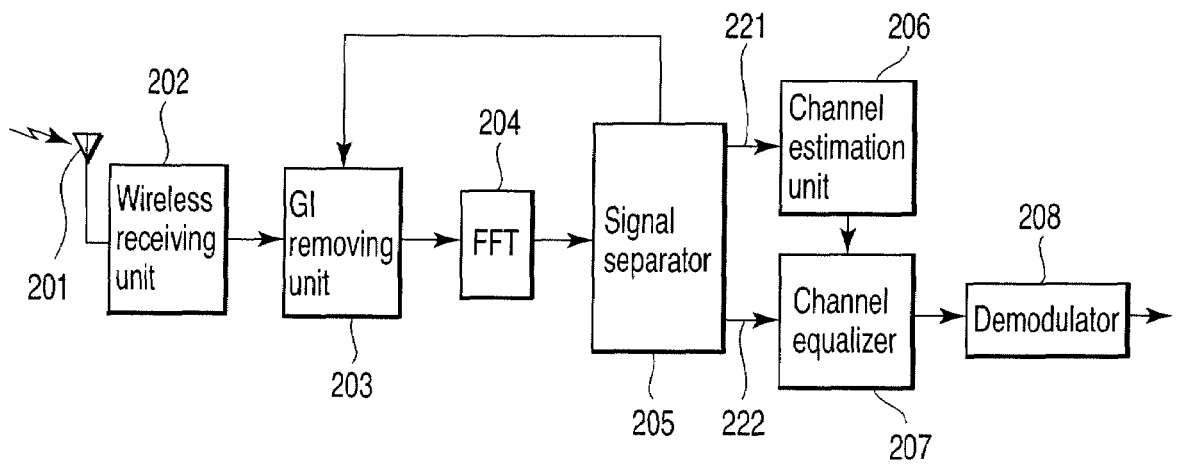
FIG. 4 is a block diagram showing an example of an OFDM receiver in FIG. 1.

The OFDM receiver 20 in FIG. 1 will be explained using FIG. 4. FIG. 4 shows a structure related to the macro diversity reception of the OFDM receiver 20. The RF signal received by an antenna 201 is converted into a baseband digital signal by a wireless receiving unit 202 which includes, for example, a low-noise amplifier (LNA), a down-converter and an analog to digital converter. After the guard interval is removed from the baseband digital signal by a GI removing unit 203, the baseband digital signal is converted into a frequency domain signal from a time domain signal, i.e., divided into signals of each subcarrier, by a fast Fourier transformation (FFT) unit 204. The output signal from the FFT unit 204 is input to a signal separator 205.

The signal separator 205 separates the pilot signal 221 and data signal 222 which are respectively allocated to the subcarriers within the subcarrier group. The separated pilot signal 221 and data signal 222 are respectively input to a channel estimation unit 206 and a channel equalizer 207. The channel estimation unit 206 carriers out channel estimation by averaging or interpolating the pilot signal 221 for each subcarrier group, and outputs a channel estimation value indicating channel response. The channel equalizer 207 equalizes the channel for the data signal 222 using the channel estimation value output from the channel estimation unit 206. The data signal obtained after channel equalization is demodulated by a demodulator 208, and a bit string which is the source of the data signal is reproduced.

The operation of channel estimation unit 206 will be explained in detail. For simplification, the widths of the time direction and the frequency direction of the subcarrier group are assumed to be sufficiently smaller than the variation cycle of the channel time direction and frequency direction, respectively. In such case, the channel response for the signal allocated to the subcarriers within the subcarrier group can be regarded as almost constant. As explained in FIG. 2, all pilot signals and data signals allocated to each subcarrier within the subcarrier group set by the subcarrier group setting unit 104 are multiplied by coefficient numbers given with respect to each subcarrier group. When R represents coefficient numbers and H represents channel response, the pilot signal and data signal allocated to each subcarrier within the same subcarrier group mutually undergoes a distortion represented by H*R. As a result, this can be regarded equivalent to the OFDM signal transmitted from the OFDM transmitter receiving a channel response represented by H*R.

In other words, even in the case where each OFDM transmitter 11, 12, . . . , 1N transmits signals respectively multiplied by different complex numbers, allocated to subcarriers within the same subcarrier group, the OFDM receiver 20 can handle them likewise the case where the signals are transmitted without being multiplied by complex numbers. Accordingly, independent of the complex numbers multiplied in the OFDM transmitters 11, 12, . . . , 1N, the channel estimation unit 206 can obtain a channel estimation value by dividing the received pilot signal by the original pilot signal. The original pilot signal is a given signal in the OFDM receiver.

When a plurality of pilot subcarriers exist within the subcarrier group, a highly accurate channel estimation value can be obtained by averaging the value obtained by dividing the pilot signal allocated to each of the pilot subcarriers by the original pilot signal. Further, when a plurality of pilot subcarriers are arranged apart from each other within the subcarrier group, a highly accurate channel estimation value can be obtained by interpolating the gap using a value obtained by dividing the pilot signal allocated to each pilot subcarrier by the original pilot signal.

The process of channel estimation and channel equalization with respect to the data subcarriers within the subcarrier group will be explained using the following equation. In the following explanation, a certain data signal is represented as D, the pilot signal allocated to the pilot subcarriers within the subcarrier group is represented as P, and the complex numbers by which the pilot signal and data signal allocated to the subcarriers within the subcarrier group at the nth OFDM transmitter in are multiplied is represented as Rn.

In addition, for simplification, the channel distortion received by the pilot signal and data signal allocated to the subcarriers within the subcarrier group can be regarded as constant, and the channel distortion of the channel between the OFDM transmitter in and the OFDM receiver 20 is represented by Hn.

In this case, the pilot signal and data signal transmitted from the OFDM transmitter in are given by $P.R_n$ and $D.R_n$, respectively. The $P.R_n$ and $D.R_n$ are subject to complex addition by the antenna 201 of the OFDM receiver after receiving channel distortion. The received pilot signal $R_{rx}$ is described as the next equation.

$$P_{rx} = P \cdot \sum_{n=1}^{N}(R_n \cdot H_n) \tag{1}$$

However, N represents the number of OFDM transmitters.

Meanwhile, the received data signal $D_{rx}$ is described as the following equation.

$$D_{rx} = D \cdot \sum_{n=1}^{N}(R_n \cdot H_n) \tag{2}$$

In this case, as shown in the following equation, the data signal D can be restored by multiplying the data signal $D_{rx}$ by the inverse number of the received pilot signal $P_{rx}$ and the given original pilot signal P.

$$D_{rx} \times \frac{P}{P_{rx}} = D \times \sum_{n=1}^{N}(R_n \times H_n) \times \frac{1}{\sum_{n=1}^{N}(R_n \times H_n)} = D \tag{3}$$

Meanwhile, according to the method shown in R1-051300, "MBMS transmission in E-UTRA", LG Electronics, 3GPP TSG RAN WG1#43, Nov. 7-11, 2005, data signal is not multiplied by complex numbers at the transmitter. Therefore, the received pilot signal $P_{rx}$ becomes, $$P_{rx} = P \cdot \sum_{n=1}^{N}(R_n \cdot H_n) \tag{4}$$

and the received data signal $D_{rx}$ becomes, $$D_{rx} = D \cdot \sum_{n=1}^{N}(H_n) \tag{5}$$

In this case, as shown in the following equation, it is obvious that the original data signal D will not be restored even if multiplying the data signal by the inverse number of the received pilot signal and P.

$$D_{rx} \cdot \frac{P}{P_{rx}} = D \cdot \sum_{n=1}^{N}(H_n) \cdot \frac{1}{\sum_{n=1}^{N}(R_n \cdot H_n)} \tag{6}$$

$$= D \cdot \frac{\sum_{n=1}^{N}(H_n)}{\sum_{n=1}^{N}(R_n \cdot H_n)}$$

To restore the original data signal D, a process to calculate $$\sum_{n=1}^{N}(H_n) \tag{7}$$

is required based on estimating each $H_n$ individually. As described earlier, in the process of estimating each Hn individually, interference may be added in some cases. In such case, the accuracy of the channel estimation value deteriorates.

The above describes the method to restore the original data signal by multiplying the received data signal by the inverse number of the received pilot signal and P. However, some other methods are described as follows.

When placing $H_{comb}$ as $$H_{comb} = \frac{P_{rx}}{P} = \sum_{n=1}^{N}(R_n \cdot H_n) \tag{8}$$

a data signal can be restored by multiplying the received data signal by the complex conjugate of $H_{comb}$ and the inverse number of the absolute value of $H_{comb}$ as shown in the following equation.

$$D_{rx} \cdot \frac{(H_{comb})^*}{|H_{comb}|} = D \cdot H_{comb} \cdot \frac{(H_{comb})^*}{|H_{comb}|} \tag{9}$$

$$= D \cdot \frac{|H_{comb}|^2}{|H_{comb}|}$$

$$= D \cdot |H_{comb}|$$

However, in this case, as the amplitude is shifted by $|H_{comb}|$, the modulation point to be compared upon demodulation also needs to be shifted by $|H_{comb}|$.

As mentioned above, according to the present embodiment, when carrying out macro diversity reception by the OFDM receiver 20 for the signals transmitted from the OFDM transmitters 11, 12, . . . , 1N, calculation amount can be reduced since there is no need to estimate each channel response individually from each OFDM transmitter 11, 12, . . . , 1N to the OFDM receiver 20. In other words, as described in equation (3), the original data signal D can be restored by simply multiplying the received data signal $D_{rx}$ by the inverse number of the received pilot signal $P_{rx}$ and the original pilot signal P. Further, it is possible to avoid interference problems which occur upon estimating each channel response individually. Moreover, it will become unnecessary to control management of the scrambling pattern to estimate each channel response individually.

Other examples of the OFDM transmitter and OFDM receiver will be explained. In the OFDM transmitter shown in FIG. 5, a scrambler 110 is added to the OFDM transmitter shown in FIG. 2. The scrambler 110 scrambles a signal 122 which is allocated to subcarriers not included in the subcarrier group set by the subcarrier setting unit 104, i.e. pilot signals and data signals to which a group index is not added. The scramble is carried out by a scrambling pattern different among each OFDM transmitter. The scrambled signal is input to an IFFT unit 106.

Figure 5:
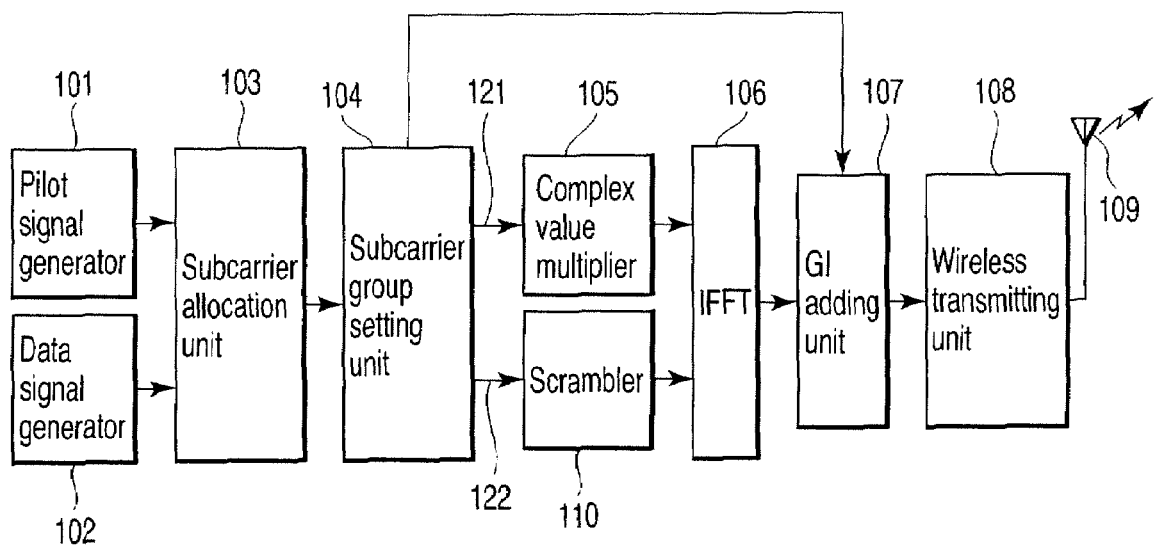
FIG. 5 is a block diagram showing another example of the OFDM transmitter in FIG. 1.
Figure 6:
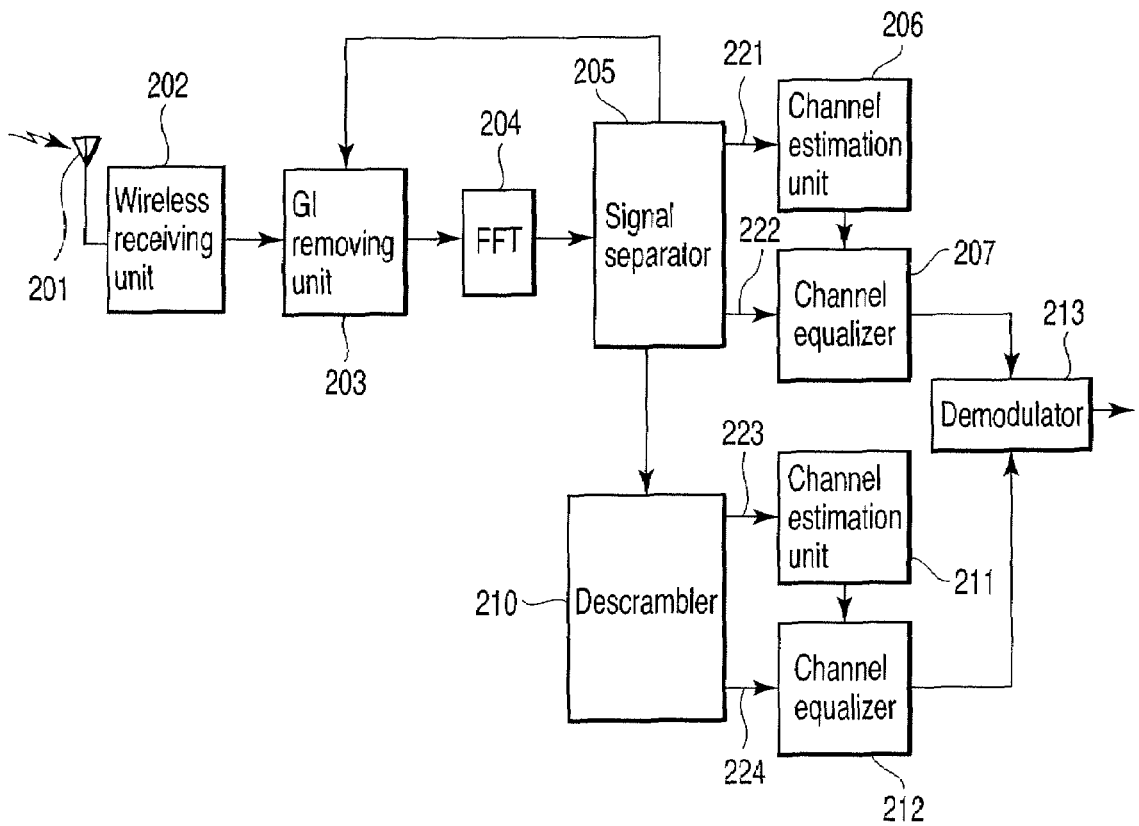
FIG. 6 is a block diagram showing another example of the OFDM receiver in FIG. 1.

FIG. 6 is an OFDM receiver corresponding to FIG. 5. It shows that a descrambler 210, a second channel estimation unit 211 and a second channel equalizer 212 are added to the OFDM receiver in FIG. 4. The signals allocated to subcarriers within the subcarrier group are processed in the same manner as in the OFDM receiver shown in FIG. 4. In other words, pilot signals 221 and 222 allocated to subcarriers within the subcarrier group and output from the signal separator 205 are input respectively to the channel estimation unit 206 and the channel equalizer 207. The channel equalizer 207 equalizes the data signal 222 using a channel estimation value output from the channel estimation unit 206. The data signal undergone channel equalization by the channel equalizer 207 is demodulated by a demodulator 213, and a bit string being the source of the data signal is reproduced thereby.

Meanwhile, the descrambler 210 descrambles the pilot signal and data signal allocated to subcarriers not included in the subcarrier group and output from the signal separator 205. The descrambler 210 performs descrambling by an inverse scramble pattern of the scramble pattern used by an OFDM transmitter which transmits signals to be received by the OFDM receiver. The pilot signal 223 and data signal 224 descrambled by the descrambler 210 are respectively input to the channel estimation unit 211 and the channel equalizer 212.

The channel estimation unit 211 estimates the channel by averaging and interpolating adjacent pilot signals, and calculates the channel estimation value which indicates a channel response. The channel equalizer 212 carries out channel equalization for the descrambled data signal using the channel estimation value output from the channel estimation unit 211. The data signal undergone channel equalization by the channel equalizer 212 is input to the demodulator 213, whereby a bit string being the source of the data signal is reproduced.

The averaging process carried out by the channel estimation unit 211 is able to reduce the power of the pilot signal which is transmitted from OFDM transmitters having different scrambling patterns and improve the accuracy of a desired channel estimation value.

In this manner, each OFDM transmitter uses different scrambling patterns to scramble signals allocated to subcarriers not included in the subcarrier group, i.e., signals not subject to macro diversity reception by the OFDM receiver 20. By doing so, a highly accurate channel estimation value can be obtained upon ordinary, but not a macro diversity, reception. Further, the scrambling pattern may be determined in advance between the transmitter and receiver. Alternatively, the OFDM receiver 20 may be notified of the transmission of a scrambling pattern from the OFDM transmitter (such as, OFDM transmitter 11) upon initiating a communication with the OFDM transmitter 11. As scrambling is carried out for signals not subject to macro diversity reception, the OFDM receiver 20 needs not know the scrambling patterns for all OFDM transmitters.

As can be comprehended from the above explanations, among the signals allocated to subcarriers not included in the subcarrier group, data signals need not necessarily undergo scrambling. Accordingly, the scrambler 110 in FIG. 5 may scramble only the pilot signal. In such case, the descrambler 210 in FIG. 6 descrambles only the pilot signal.

A more specific setting method of the subcarrier group will be explained using FIGS. 7 to 16 and FIGS. 17A and 17B.

As mentioned above, the subcarrier group is set to include at least one pilot subcarrier and one data subcarrier. In the following description, a specific example of the subcarrier group setting method is illustrated by citing the case of a cycle where one pilot subcarrier is inserted for every four subcarriers on the frequency axis and one pilot subcarrier is inserted for every seven subcarriers on the time axis. In the following explanation, an OFDM symbol represents a unit of OFDM signals generated by performing one IFFT. A plurality of subcarriers is included in one OFDM symbol. In FIGS. 7 to 16 and FIGS. 17A and 17B, the frequency axis indicates a subcarrier number within one OFDM symbol, and the time axis indicates the OFDM symbol number.

(First Subcarrier Group Setting Method)

Figure 7:
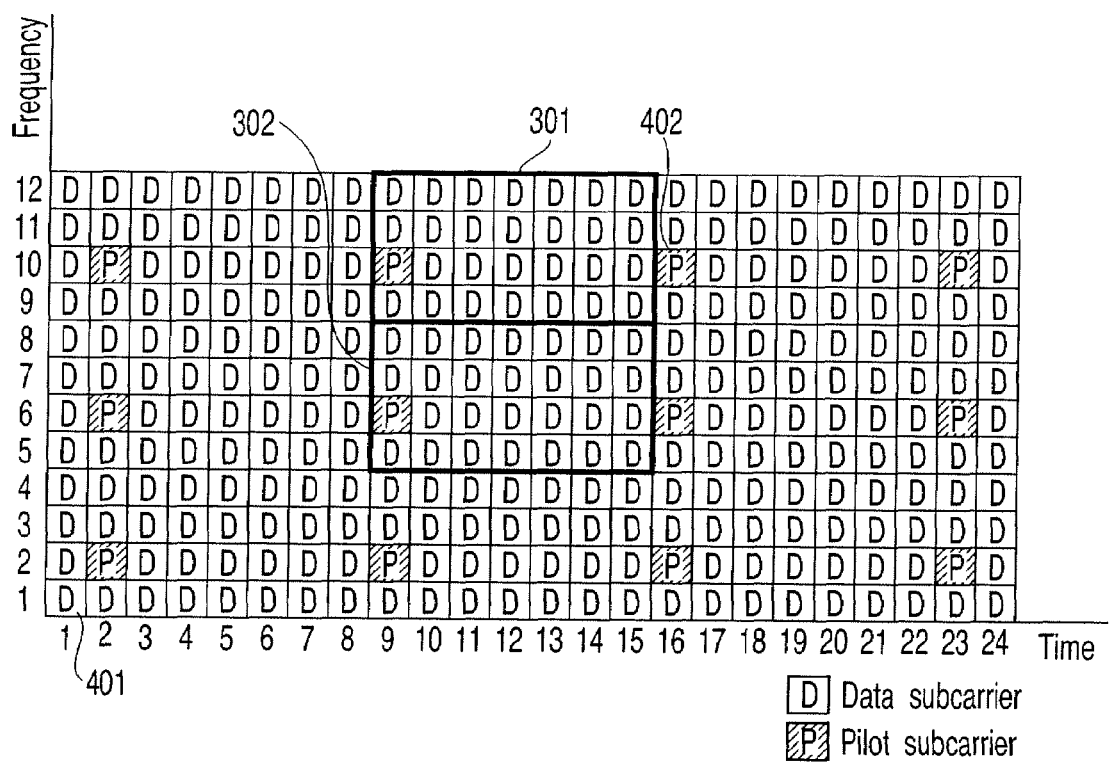
FIG. 7 illustrates a first subcarrier group setting method.

According to a first subcarrier group setting method, a subcarrier group is set up by subcarriers within a particular domain (time-frequency domain) sectioned in quadrate by the time axis and frequency axis. In other words, a subcarrier group is set up by subcarriers (pilot subcarriers and data subcarriers) comprised in a plurality of successive OFDM symbols. For instance, the example of FIG. 7 can be represented in the following equation. In FIG. 7, a position on the frequency axis is referred to as "i", and the position on the time axis is referred to as "j". Therefore, the position of a subcarrier 401 is referred to as (i, j)=(1, 1), and the signal allocated to the subcarrier of position (i, j) is referred to as $S_{i,j}$. The signals allocated to subcarriers within a subcarrier group 301 are multiplied by complex numbers referred to as R[1], and a subcarrier group 302 is multiplied by the complex numbers referred to as R[2]. The following equation shows the process of multiplying each subcarrier group by a complex number.

$$S_{i,j} \cdot R(i,j) \qquad (10)$$

$$R(i,j) = \begin{cases} R[\lfloor (i-1)/4 \rfloor] & (9 \le j \le 15 \text{ and } 5 \le i \le 12) \\ 1 & \text{(other)} \end{cases}$$

Figure 8:
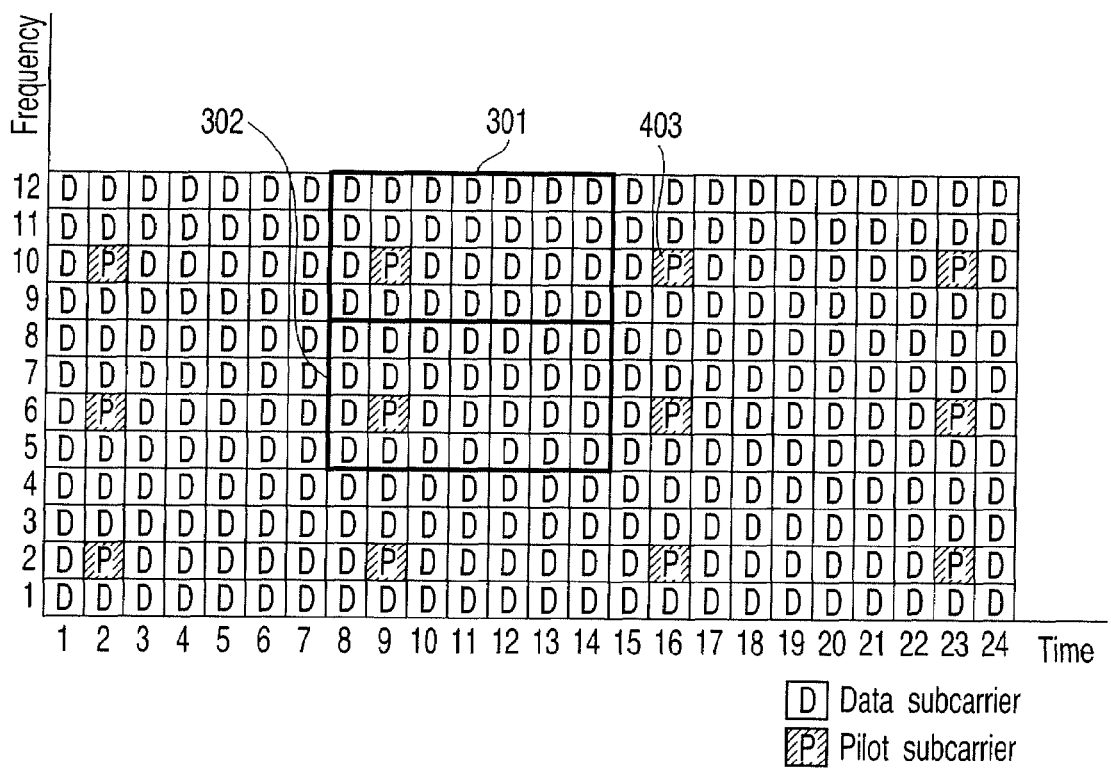
FIG. 8 illustrates the first subcarrier group setting method.
Figure 9:
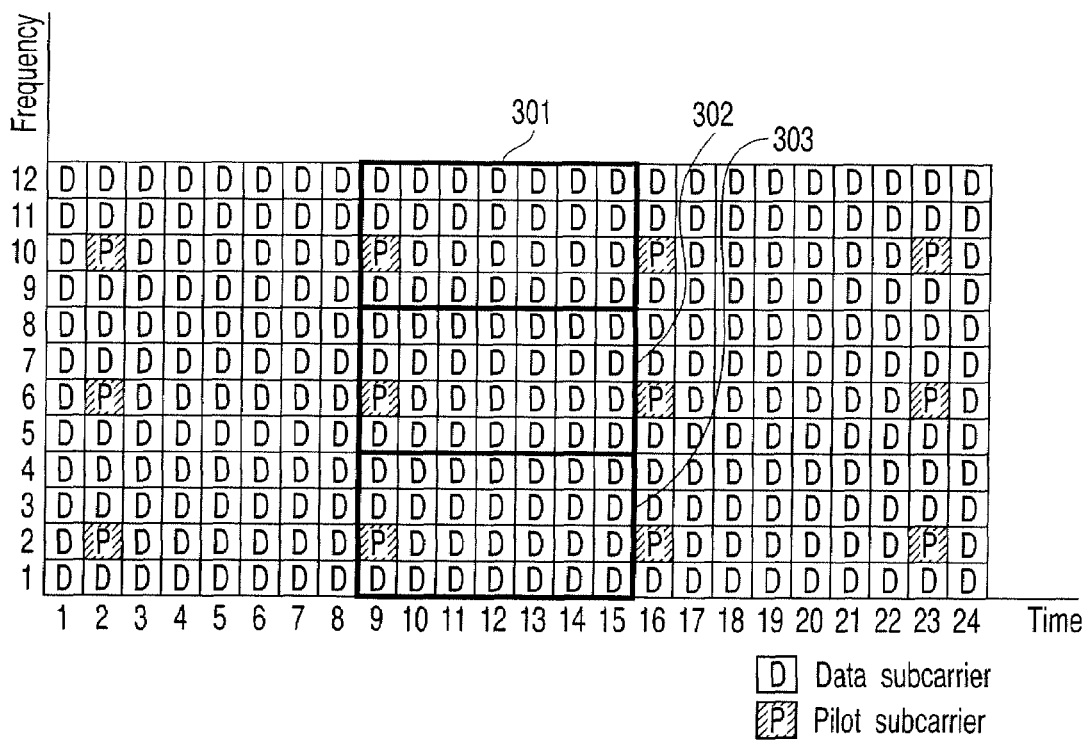
FIG. 9 illustrates the first subcarrier group setting method.

According to the first subcarrier group setting method, in the case where boundaries are defined in constant subcarrier intervals on the frequency axis and time axis, there is an advantage that the subcarriers can be readily arranged in a way that the subcarrier group does not cross such boundaries. For example, when forming one frame with a 70 FDM symbol, quadrangle subcarrier groups 301 and 302, or subcarrier groups 301, 302 and 303 are set in the size of 4 subcarriers in the frequency direction and 7 subcarriers in the time direction as shown in FIGS. 7, 8 and 9. Herewith, it is possible to generate a subcarrier group without crossing the frame boundary, which includes one pilot subcarrier for every subcarrier group.

Figure 10:
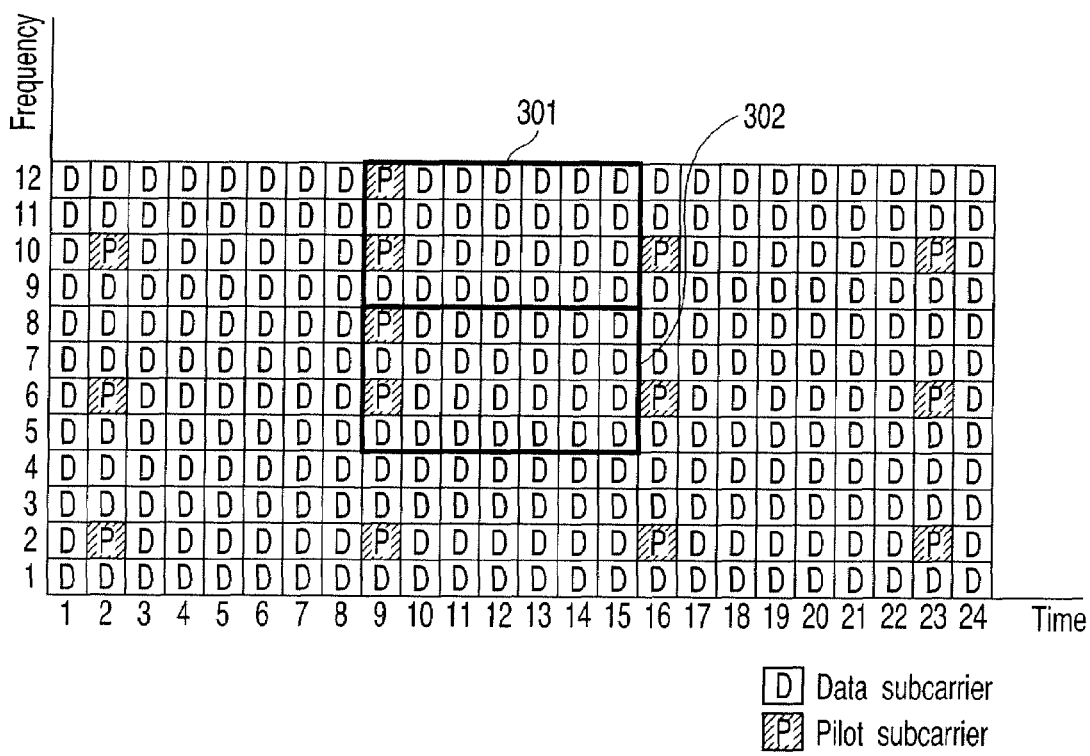
FIG. 10 illustrates the first subcarrier group setting method.

FIGS. 7 and 8 show examples in the case where each frame boundary is positioned in the seventh and sixth position counting from an OFDM symbol with a pilot subcarrier. FIG. 9 shows an example of paving the subcarrier groups 301, 302 and 303 in the frequency direction, i.e., arranging the subcarrier groups 301, 302 and 303 successively across the entire length of the OFDM symbol, in a certain time zone. According to the example of FIG. 9, all subcarriers in such time zone belong to any one of the subcarrier groups 301, 302 and 303. Accordingly, the OFDM receiver is able to perform macro diversity reception for any of the subcarriers during such time zone. FIG. 10 shows an example of increasing the density of the pilot subcarriers within the subcarrier groups 301 and 302 compared to that outside the subcarrier groups. According to the example of FIG. 10, the receiving performance of the data subcarriers within the subcarrier group can be improved.

(Second Subcarrier Group Setting Method)

In a second subcarrier group setting method, a subcarrier group is set by the combination of subcarriers (pilot subcarriers and data subcarriers) within a quadrate time-frequency domain and at least one pilot subcarrier arranged outside the quadrate domain, where such pilot subcarrier is arranged in the same frequency axis but on a different time axis from at least one pilot subcarrier or data subcarrier within these quadrate domains. In other words, the subcarrier group is set by subcarriers (pilot subcarriers and data subcarriers) included in a plurality of consecutive OFDM symbols and a pilot subcarrier which has a frequency equivalent to at least one pilot subcarrier or data subcarrier included in the plurality of consecutive OFDM symbols and is included in at least one OFDM symbol close to the plurality of consecutive OFDM symbols.

Figure 11:
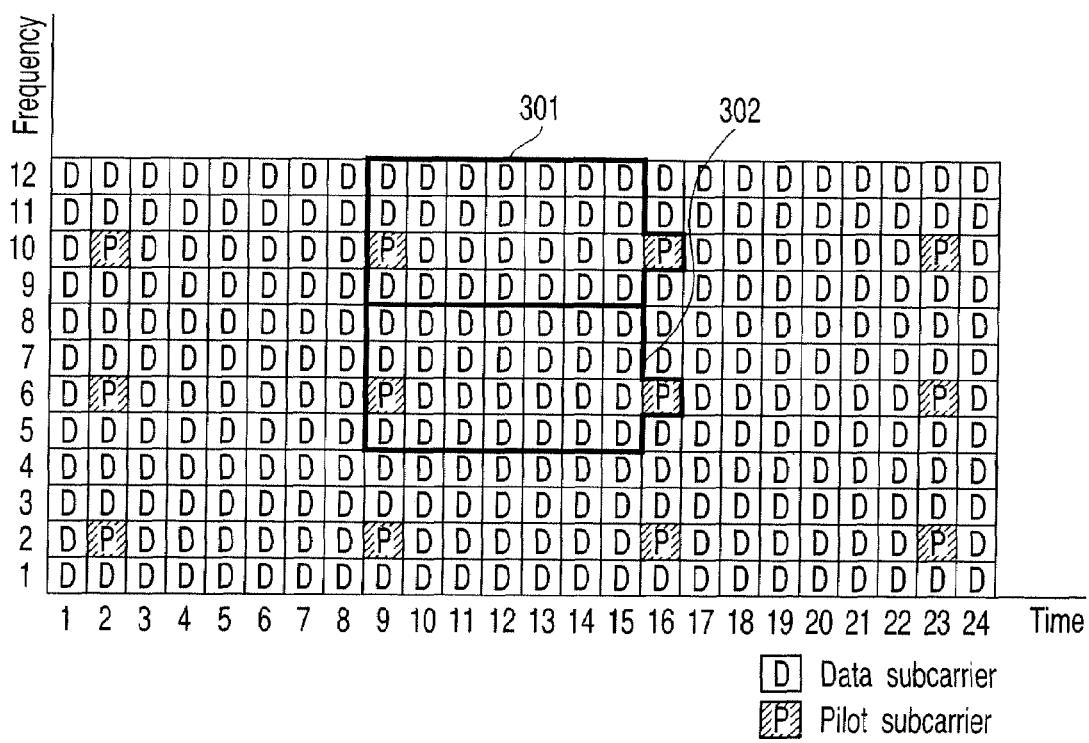
FIG. 11 illustrates a second subcarrier group setting method.
Figure 12:
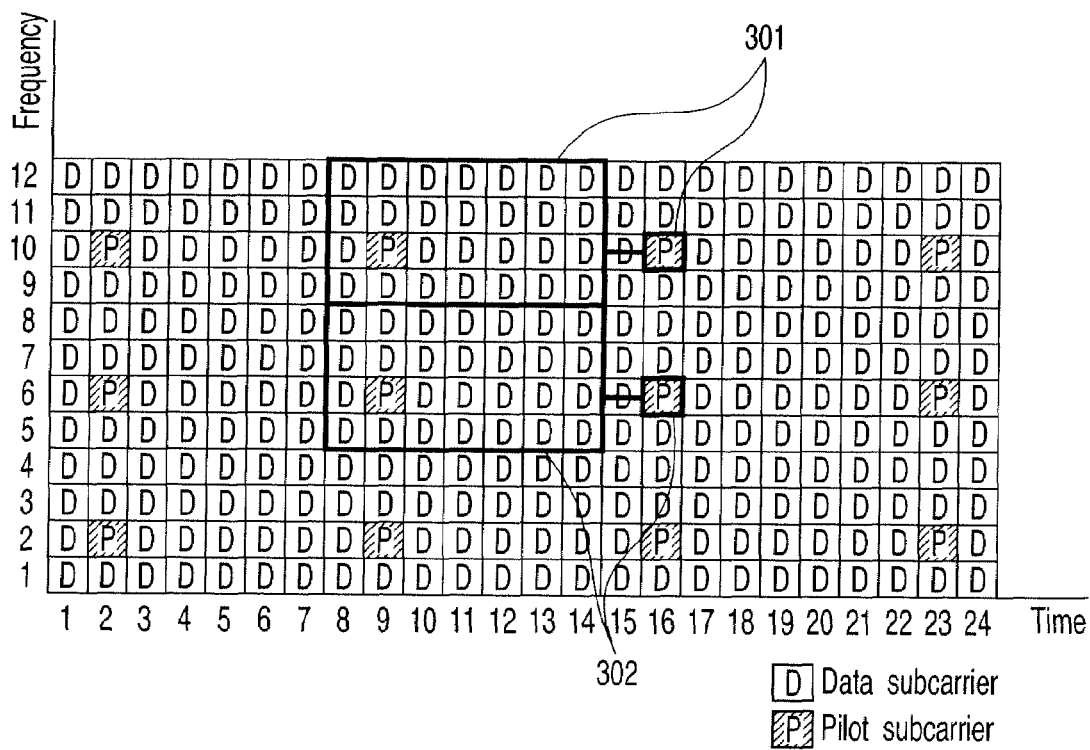
FIG. 12 illustrates the second subcarrier group setting method.
Figure 13:
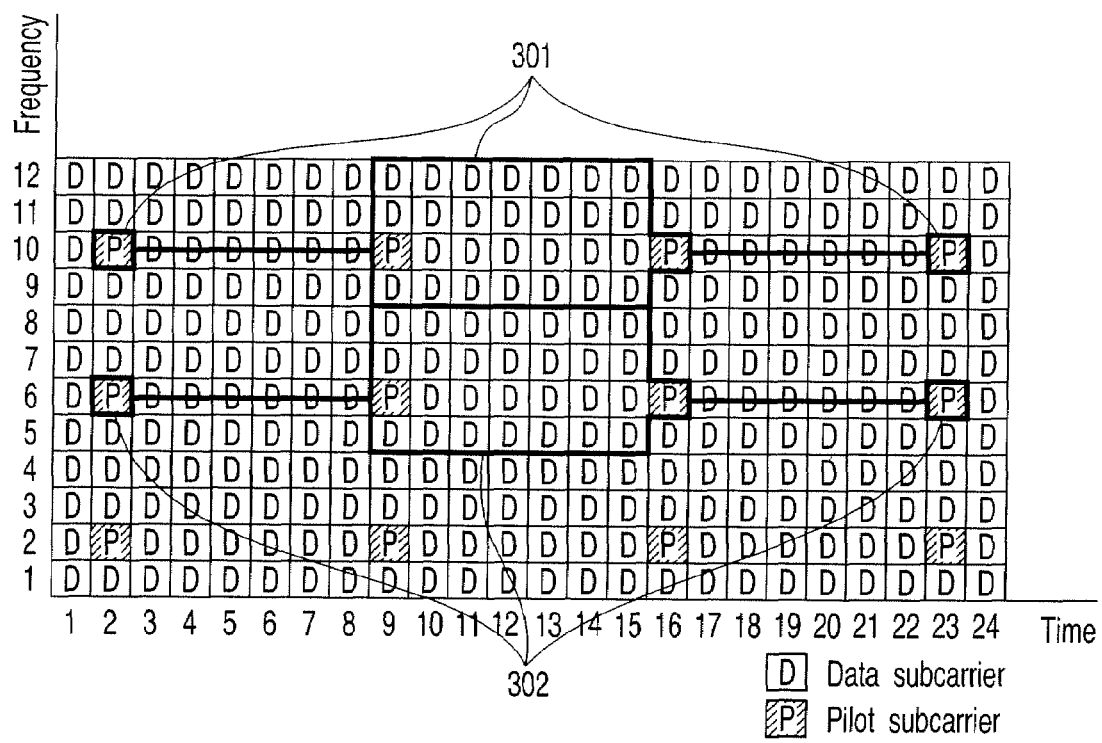
FIG. 13 illustrates the second subcarrier group setting method.

For example, FIG. 11 shows subcarrier groups 301 and 302 each including a pilot subcarrier positioned in the same frequency axis as the pilot subcarriers within the subcarrier group (quadrant domain) shown in FIG. 7 and close to the right side of the quadrant. Similarly, FIG. 12 shows subcarrier groups 301 and 302 each including a pilot subcarrier positioned in the same frequency axis as the pilot subcarriers within the subcarrier group (quadrant domain) shown in FIG. 8 and close to the right side of the quadrant domain. Further, FIG. 13 shows subcarrier groups 301 and 302 each including two pilot subcarriers before and after the subcarrier group in FIG. 11.

According to the second subcarrier group setting method, it can facilitate estimation of the time domain variation of channel response for channel estimation carried out for each subcarrier group. Accordingly, it has the advantage of being able to improve the accuracy of channel estimation in the case where this variation is large.

In the case of applying the second subcarrier group setting method to the OFDM transmitter shown in FIG. 5, the range of the subcarrier group may be interpreted differently. In the OFDM transmitter shown in FIG. 5, scrambling is performed on the signal allocated to subcarriers outside the subcarrier group. When the signals allocated to the subcarriers within the subcarrier group 301 in FIG. 7 are multiplied by the complex numbers identical to the complex numbers used to scramble the pilot signal allocated to the pilot subcarrier 402, the subcarrier groups in FIG. 7 and FIG. 11 can be considered identical.

Similarly, when the signals allocated to the subcarriers within the subcarrier group 301 in FIG. 8 are multiplied by the complex numbers identical to the complex numbers used to scramble the pilot signal allocated to the pilot subcarrier 403, the subcarrier group in FIG. 8 can be regarded as equivalent to the subcarrier group in FIG. 12.

In such manner, by multiplying the signals allocated to subcarriers within the subcarrier group by complex numbers identical to the complex numbers used to scramble the pilot signal allocated to the subcarriers outside the subcarrier group, the pilot signal allocated to the subcarriers outside the subcarrier group can be identified as equivalent to the pilot signals allocated to subcarriers within the subcarrier group. Accordingly, it is possible to improve the accuracy of channel estimation of the channel corresponding to the subcarrier group.

The shape of the subcarrier group need not necessarily be a complete quadrate. For example, the quadrate may be formed by excluding less than half of the entire subcarriers within the subcarrier group. By doing so, a subcarrier group with higher flexibility can be designed. When it is required to further enhance flexibility of the subcarrier group, the subcarriers within the subcarrier group need not necessarily be formed in a shape close to a quadrate. In such case, for example, at least the data subcarriers within the subcarrier group can be arranged successively in the frequency direction or the time direction. This may facilitate channel equalization due to the rise in correlation of channel distortion between data subcarriers within the subcarrier group.

Figure 14:
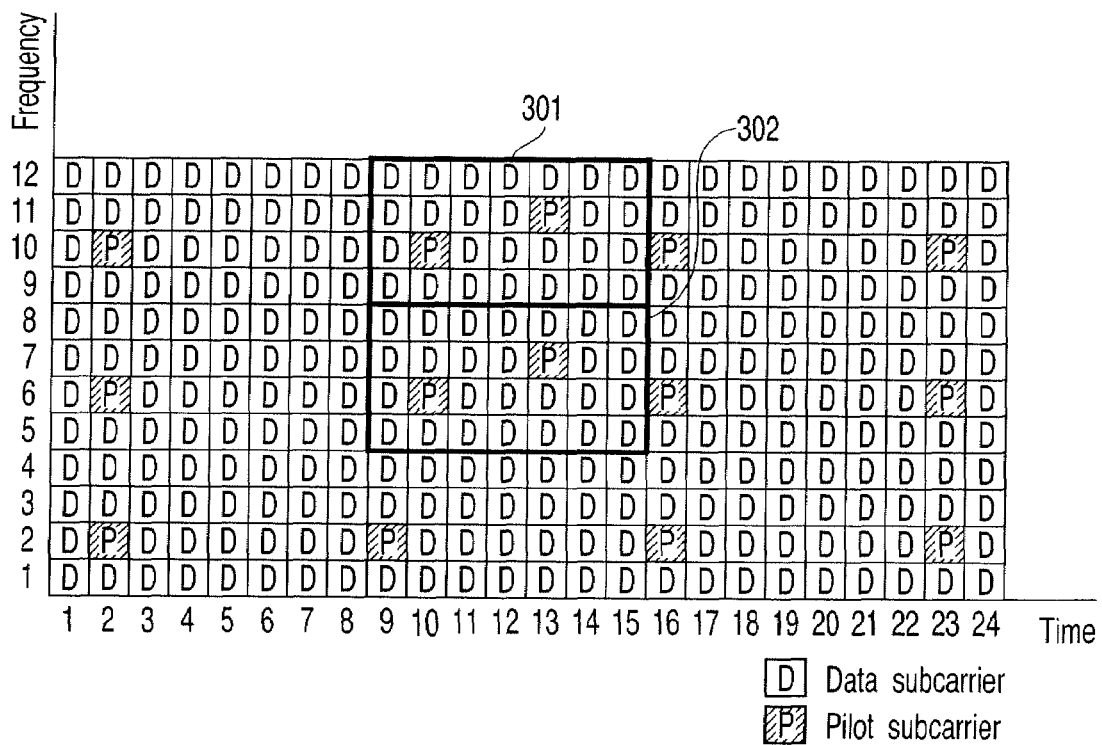
FIG. 14 illustrates an allocation method of pilot subcarriers within the subcarrier group.
Figure 15:
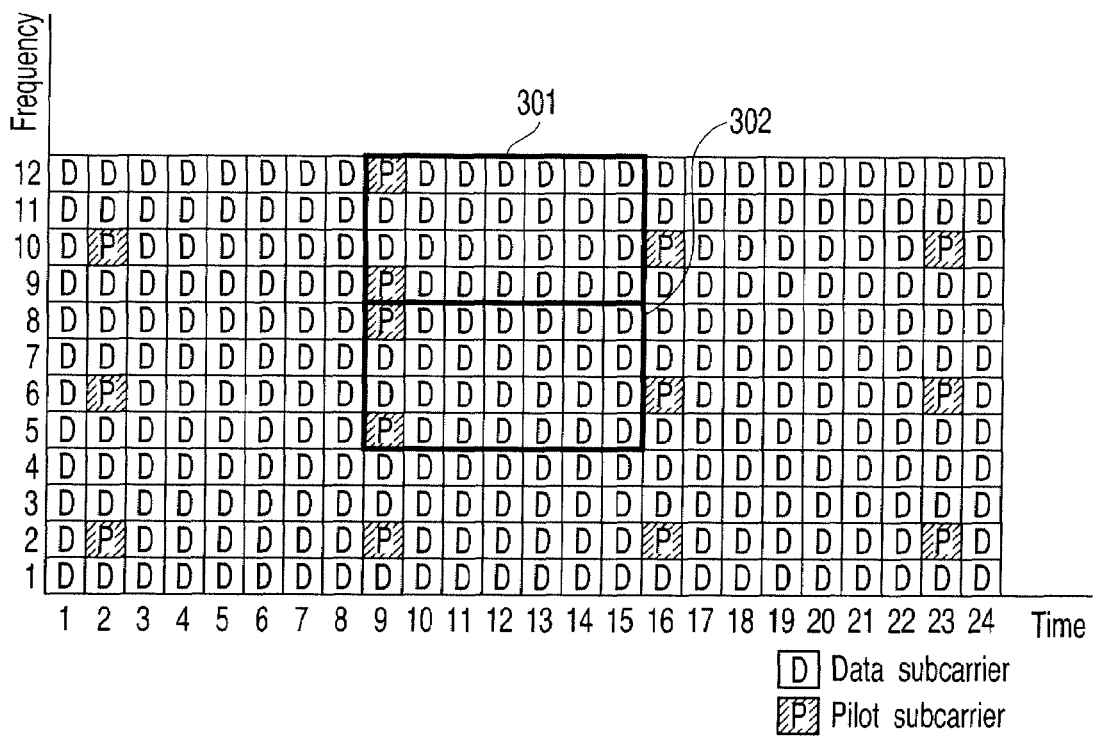
FIG. 15 illustrates the allocation method of the pilot subcarriers within the subcarrier group.
Figure 16:
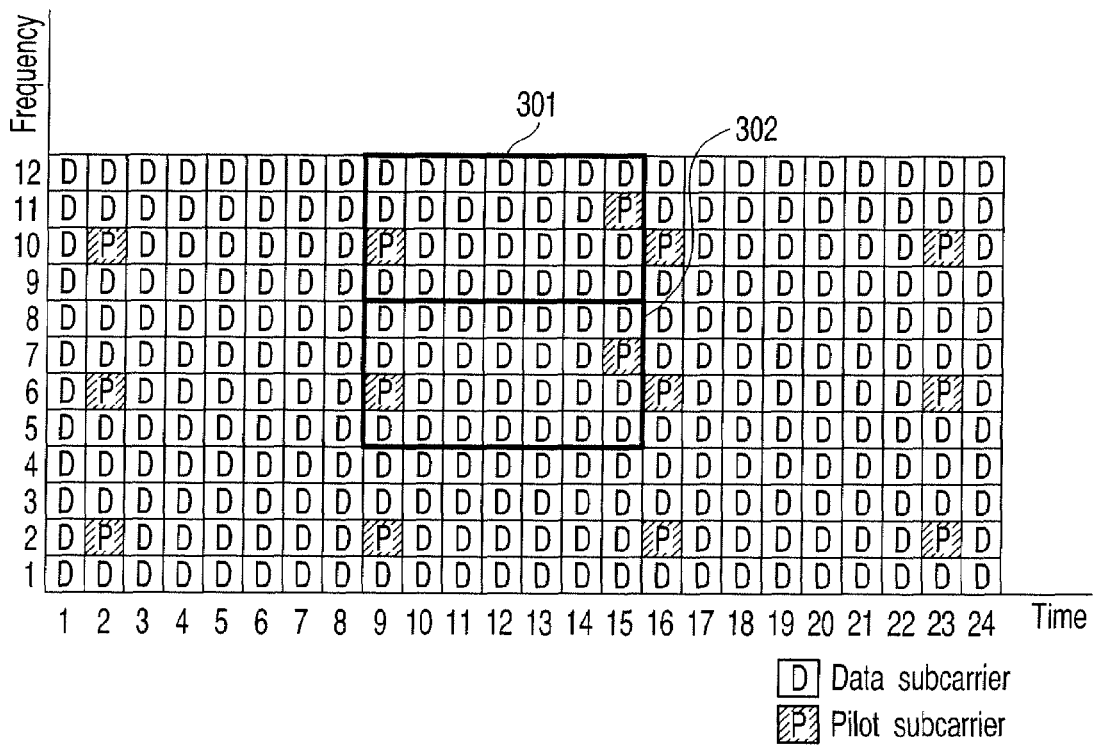
FIG. 16 illustrates the allocation method of the pilot subcarriers within the subcarrier group.

A specific example of a layout method of the pilot subcarriers within the subcarrier group will be shown using FIGS. 14, 15 and 16. In the example shown in FIG. 14, the pilot subcarriers within the subcarrier group are arranged uniformly dispersed in the time direction and frequency direction. By dispersing the pilot subcarriers within the subcarrier group in such way, channel estimation can be performed in compliance with the variation of both the time direction and frequency direction of the channel response.

In the example of FIG. 15, pilot subcarriers are arranged preferentially on both ends of the frequency direction within the subcarrier group. When the variation is significant in the frequency direction of the channel response, the variation of the channel response will be estimated using the pilot signals allocated to the subcarriers within the subcarrier group. When carrying out channel estimation using the pilot signals, for exact channel estimation, it is preferred that channel response is determined even for the subcarrier positions (frequency) where the pilot signals are not allocated. For such reason, it is necessary to determine the pilot signals of the subcarrier positions where pilot signals are not allocated by interpolating or extrapolating. Here, the accuracy of channel estimation is known to be lower when extrapolating rather than interpolating the pilot signals. Therefore, the accuracy of channel estimation can be improved by preferentially arranging the pilot subcarriers on both ends of the frequency direction within the subcarrier group as shown in FIG. 15 to reduce the necessity to extrapolate the pilot signals.

In the example shown in FIG. 16, pilot subcarriers are arranged preferentially on both ends of the time direction within the subcarrier group. When the variation of channel response is significant in the time direction, the necessity to extrapolate the pilot signals is reduced based on the same reason as the example of FIG. 15, and the channel estimation accuracy can be improved.

An example of using different complex numbers sequences for each subcarrier group will be explained using FIGS. 17A and 17B. According to circumstances, a different or same sequence is chosen between the OFDM transmitters as the complex numbers sequence. Here, a specific example will be shown in the case of choosing a different complex numbers sequence between the OFDM transmitters.

Figure 17A:
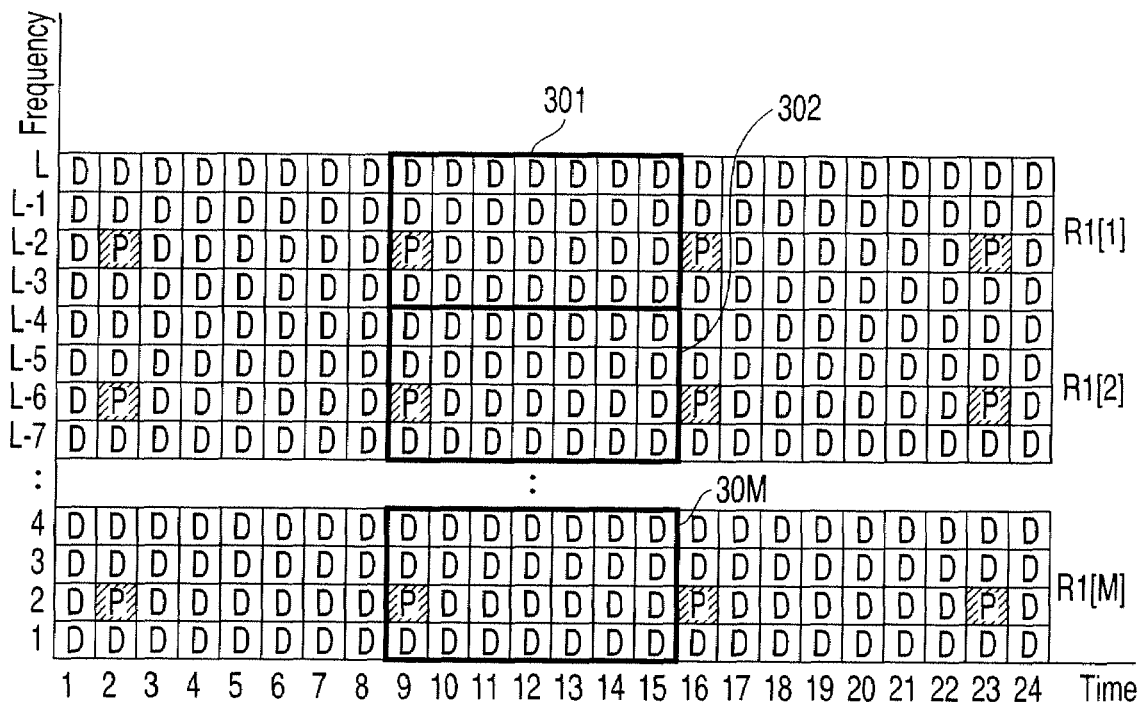
FIG. 17A illustrates a complex numbers sequence given to each subcarrier group.
Figure 17B:
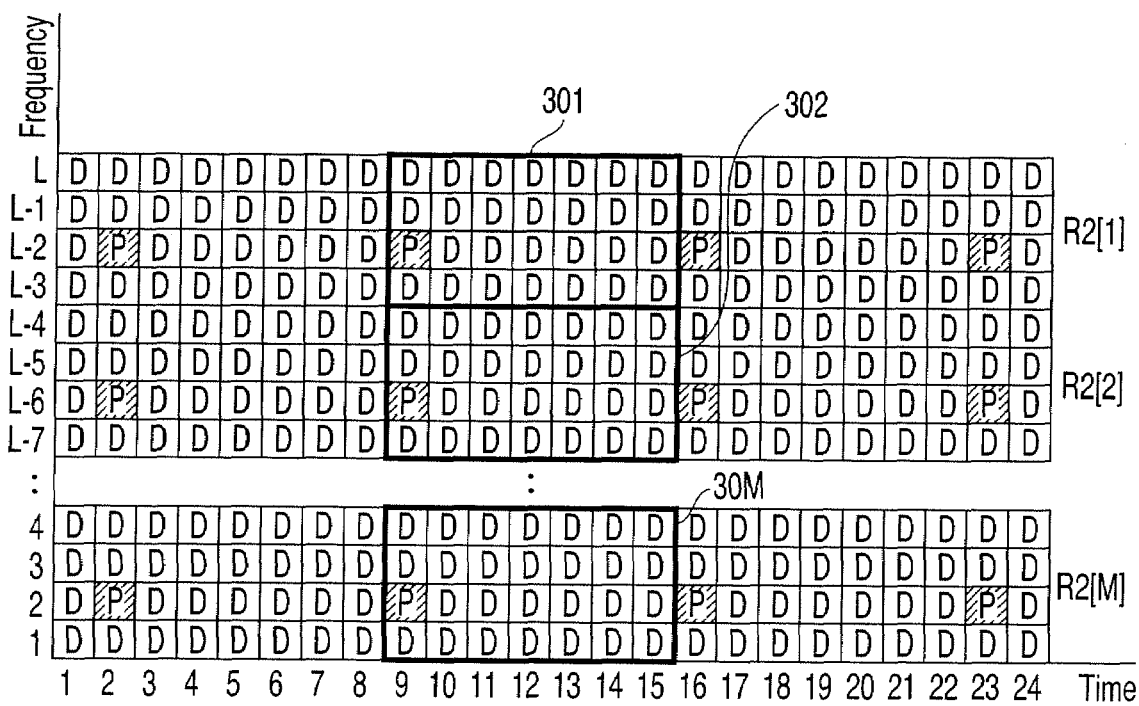
FIG. 17B illustrates a complex numbers sequence given to each subcarrier group.

FIGS. 17A and 17B each show the subcarrier arrangement of the OFDM signals transmitted from each of the OFDM transmitters 11 and 12 and the sequence of complex numbers. The sequence of complex numbers in FIG. 17A is $R_1[1]$, $R_1[2], \ldots, R_1[N]$, and in FIG. 17B is $R_2[1], R_2[2], \ldots, R_2[N]$. In the OFDM transmitter shown in FIG. 5, interference can be reduced for signals allocated to subcarriers outside the subcarrier group by subjecting such signals to scrambling. This is because signals from other OFDM transmitters become interferences, unlike the signals allocated to the subcarriers belonging to a subcarrier group.

Therefore, in this example, the complex numbers sequences of $R_1[1], R_1[2], \ldots, R_1[N]$ and $R_2[1], R_2[2], \ldots, R_2[N]$ are arranged mutually in orthogonal or pseudo orthogonal relation. This can also reduce interference for pilot signals allocated to pilot subcarriers within a subcarrier group, and can also be used for channel estimation in a non-macro diversity reception. Here, as mentioned earlier, "mutually orthogonal" means that the correlation value becomes 0, and "mutually pseudo orthogonal" means that the absolute value of correlation value becomes a smaller value than an auto-correlation value. The auto-correlation value of a certain sequence x [k] (k=1, ..., K) and the correlation value of two sequences x [k], y [k] (k=1, ..., K) can be represented by the following equations.

$$\sum_{k=1}^{K} x[k] \cdot x[k]^* \quad (11)$$

$$\sum_{k=1}^{K} x[k] \cdot y[k]^* \quad (12)$$

When the sequence length is 4, the following four sequences $R_1$, $R_2$, $R_3$ and $R_4$ can be cited as an example of complex numbers sequence mutually in orthogonal relations.

$R_1 = \{+1,+1,+1,+1\}$ $R_2 = \{+1,+1,-1,-1\}$ $R_3 = \{+1,-1,-1,+1\}$ $R_4 = \{+1,-1,+1,-1\}$ (13)

The four complex numbers sequences $R_1$, $R_2$, $R_3$ and $R_4$ in equation (13) have six correlation values all in 0, and are mutually orthogonal. Generally, when the sequence length is $2^K$, a maximum of $2^K$ pieces of complex numbers sequences mutually in orthogonal relation can be generated. Other examples, such as the four complex numbers sequences $R_1$, $R_2$, $R_3$ and $R_4$ below also have six correlation values all in 0, and are mutually orthogonal.

$R_1 = \{+i,+i,+i,+i\}$ $R_2 = \{+i,+i,-i,-i\}$ $R_3 = \{+i,-i,-i,+i\}$ $R_4 = \{+i,-i,+i,-i\}$ (14)

Meanwhile, as an example of complex numbers sequence in pseudo orthogonal relation, the following six sequences $R_1$, $R_2$, $R_3$, $R_4$, $R_5$ and $R_6$ can be cited.

$R_1 = \{+1,+1,+1,+1\}$ $R_2 = \{+1,+1,-1,-1\}$ $R_3 = \{+1,-1,-1,+1\}$ $R_4 = \{+1,-1,+1,-1\}$ $R_5 = \{+1,+1,+1,-1\}$ $R_6 = \{+1,-1,+1,+1\}$ (15)

For the six complex numbers sequences $R_1$, $R_2$, $R_3$, $R_4$, $R_5$ and $R_6$ in equation (15) in which the sequence length is 4, the correlation value is either 0 or 2 whereas each of the auto correlation values is 4. For instance, the six correlation values among $R_1$, $R_2$, $R_3$ and $R_4$ and the correlation value between $R_5$ and $R_6$ are all 0. However, the four correlation values between $R_1$, $R_2$, $R_3$ and $R_4$ and $R_5$ and $R_6$ are all 2. Accordingly, more sequences can be generated by including sequences which are mutually in pseudo orthogonal relation, i.e. sequences which do not restrict the correlation value to 0, as the complex numbers sequence, than sequences which are mutually in orthogonal relation, i.e. sequences which restrict the correlation value to 0.

FIG. 24 shows an OFDM receiver suitable in the case where the complex numbers sequence is orthogonal or pseudo orthogonal between the transmitters. The differences between the OFDM receiver in FIG. 6 is that the pilot signal 221 allocated to the pilot subcarriers within the subcarrier group and output from the signal separator 205 is input to a complex numbers multiplier 214, that the pilot signal 225 multiplied by complex numbers by the complex numbers multiplier 214 is input to a channel estimation unit 211, and that the channel estimation unit 211 carries out channel estimation of the pilot signals 223 and 225.

Signals allocated to subcarriers within a subcarrier group are basically processed likewise the process in the OFDM receiver shown in FIG. 6. In other words, the pilot signal 221 and data signal 222 of each subcarrier group output from the signal separator 205 are input respectively to the channel estimation unit 206 and channel equalizer 207. The channel equalizer 207 equalizes the channel data 222 using the channel estimation value output from the channel estimation unit 206. The data signal obtained after channel equalization by the channel equalizer 207 is demodulated by the demodulator 213, and a bit string which is the source of the data signal is reproduced.

Meanwhile, signals allocated to subcarriers outside the subcarrier group are also processed likewise the process in the OFDM receiver shown in FIG. 6. In other words, a descrambler 210 descrambles the pilot signals and data signals allocated to subcarriers outside the subcarrier group and output from the signal separator 205. The descrambler 210 performs descrambling by an inverse scramble pattern of the scramble pattern used by an OFDM transmitter which transmits signals to be received by the OFDM receiver. The pilot signal 223 and data signal 224 descrambled by the descrambler 210 are respectively input to the channel estimation unit 211 and channel equalizer 212.

Meanwhile, the pilot signal 221 allocated to pilot subcarriers within the subcarrier group and output from the signal separator 205 is further multiplied by complex numbers by the complex numbers multiplier 214. The complex numbers multiplier 214 multiplies the pilot signal 221 by a complex number relevant to a complex conjugate of the complex number used by the complex numbers multiplier 105 shown in FIG. 5 within the OFDM transmitter transmitting signals to be received by the OFDM receiver. The pilot signal 225 multiplied by the complex numbers by the complex numbers multiplier 214 is input to the channel estimation unit 211.

The channel estimation unit 211 performs channel estimation by equalizing and interpolating adjacent pilot signals to calculate the channel estimation value which indicates channel response. The channel equalizer 212 equalizes the descrambled data signal using the channel estimation value output from the channel estimation unit 211. The data signal obtained after channel equalization by the channel equalizer 212 is input to the modulator 213, whereby a bit string being the source of the data signal is reproduced.

The averaging process carried out by the channel estimation unit 211 enables to lessen power for pilot signals transmitted from OFDM transmitters having different scrambling patterns, thereby improving the accuracy of a desired channel estimation value.

Further, the channel estimation unit 211 performs channel estimation using the pilot signal 225 allocated to the subcarriers within the subcarrier group and multiplied by a complex number by the complex numbers multiplier 214, in addition to the pilot signal 223 allocated to the subcarriers outside the subcarrier group and descrambled by the descrambler 210. Accordingly, the channel estimation unit 211 can use more pilot signals for channel estimation in comparison to the OFDM receiver in FIG. 6. Therefore, the accuracy of channel estimation can be further improved.

(Guard Interval Length Setting Method)

Now, a method for setting the length of guard interval added by the GI adding unit 107 shown in FIG. 2 or FIG. 5 will be explained. A guard interval is added by copying a part of a time waveform onto every OFDM symbol. It is possible to reduce interference between symbols caused by delay wave by adding a guard interval to the OFDM symbol. Generally, the longer the guard interval length the more it can endure a multipath environment of larger delay spread (delay profile).

As mentioned earlier, the OFDM receiver 20 is able to perform macro diversity reception for signals allocated to subcarriers within a subcarrier group. In such case, since the OFDM receiver 20 receives signals from a plurality of OFDM transmitters 11, 12, . . . , 1N simultaneously, in some cases, the delay spread may become relatively large in comparison to receiving signals from one transmitter.

Thus, the receiving performance for OFDM symbols which include subcarriers within a subcarrier group is improved by setting a longer guard interval than the other OFDM symbols. Specifically, as shown in FIGS. 2 and 5, the subcarrier group setting unit 104 provides the GI adding unit 107 with subcarrier position information which indicates the position of subcarriers within the subcarrier. When the OFDM symbol including at least one subcarrier within the subcarrier group is input from the IFFT unit 106, based on the subcarrier position information, the GI adding unit 107 adds to the OFDM signal a longer guard interval than in the case where an OFDM symbol including subcarriers outside the subcarrier group is input.

By setting the guard interval length in such manner, the OFDM receiver 20 deals with a large delay spread which occurs upon macro diversity reception, thereby improving reception performance.

Specific examples of setting the guard interval length will be described. For instance, in the example of subcarrier group setting shown in FIG. 7, the guard interval length for seven OFDM symbols including subcarriers within the subcarrier group is set longer than that for the OFDM symbols not including subcarriers within the subcarrier group. Meanwhile, in the example of subcarrier group setting shown in FIG. 11, the guard interval length for seven OFDM symbols including data subcarriers within the subcarrier group is set longer than that for the OFDM symbols not including data subcarriers within the subcarrier group. Further, in the example of subcarrier group setting shown in FIG. 11, the guard interval length for eight OFDM symbols including data and pilot subcarriers within the subcarrier group may be set longer than that for the OFDM symbols not including subcarriers within the subcarrier group.

Figure 19:
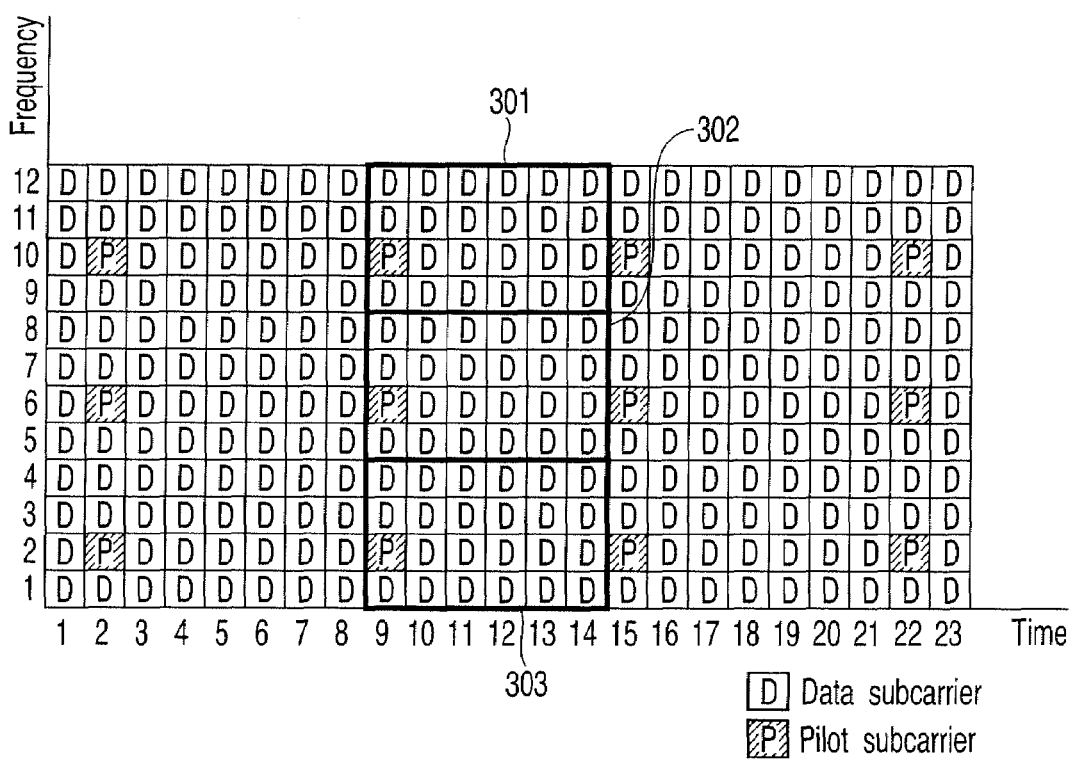
FIG. 19 illustrates the setting method of a guard interval length.

In the example of subcarrier group setting shown in FIG. 19, the guard interval length for OFDM symbols including subcarriers within the subcarrier group is set longer than the OFDM symbols not including subcarriers within the subcarrier group. Further, the OFDM symbols including subcarriers within the subcarrier group may be decimated.

Figure 20:
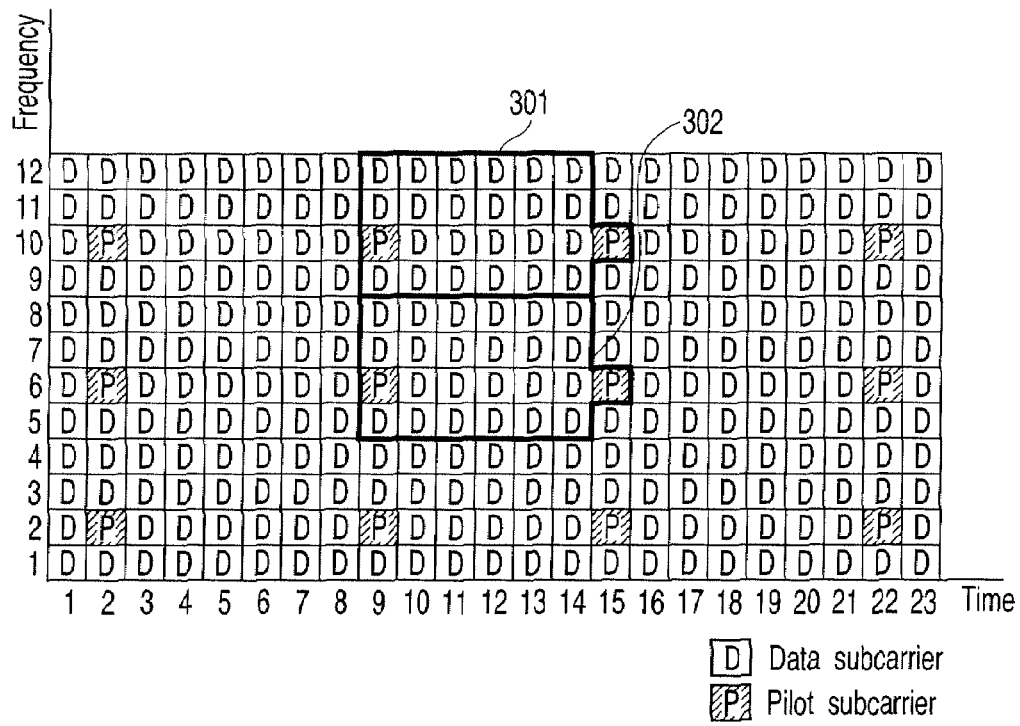
FIG. 20 illustrates the setting method of the guard interval length.

In the example of subcarrier group setting shown in FIG. 20, the guard interval length for OFDM symbols including data and pilot subcarriers within the subcarrier group is set longer than the OFDM symbols not including subcarriers within the subcarrier group. Further, the OFDM symbols including data and pilot subcarriers within the subcarrier group may be decimated.

Figure 21:
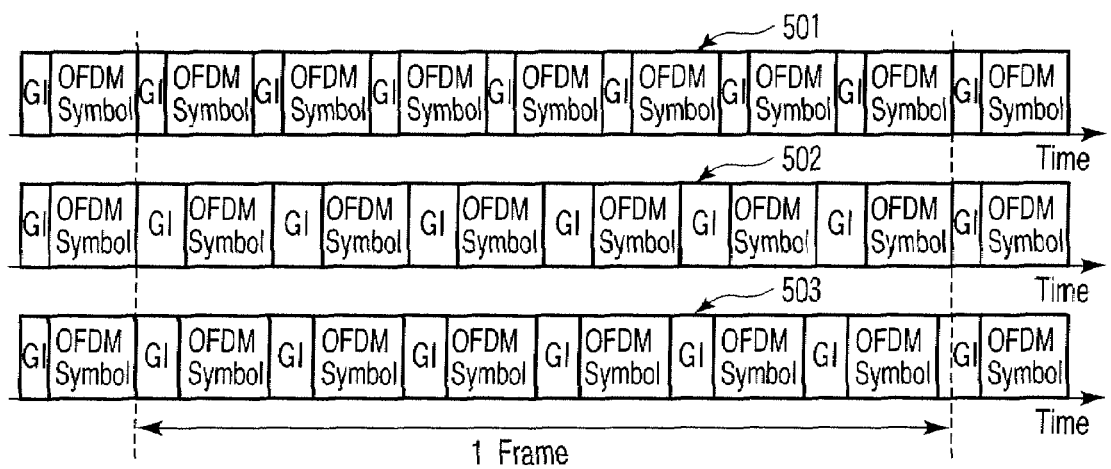
FIG. 21 illustrates an example of the guard interval length setting when decimating an OFDM symbol.

An example of setting the guard interval length in the case where the OFDM symbol is decimated as mentioned above will be explained using FIG. 21. In a usual guard interval length, one frame consists of seven OFDM symbols as shown by frame structure 501 in FIG. 21. For instance, when an OFDM symbol having a longer guard interval length than the other OFDM symbols is stored in one frame as in FIG. 19, at least one OFDM symbol is decimated as shown by frame structure 502, and the guard interval length is enlarged instead.

Likewise the case where the guard interval length of the OFDM symbol including data and pilot subcarriers within the subcarrier group is made larger than the other OFDM symbols in the example of FIG. 20, when the OFDM symbol with a longer guard interval length than the others cannot be stored within one frame, a part of the frame is allotted to the guard interval of the OFDM symbol positioned at the beginning of the succeeding frame as shown by frame structure 503. With that, the OFDM symbol of the subsequent frame need not be decimated, and only the guard interval length for the first OFDM symbol can be set longer.

(Data Signal Contents)

Figure 18:
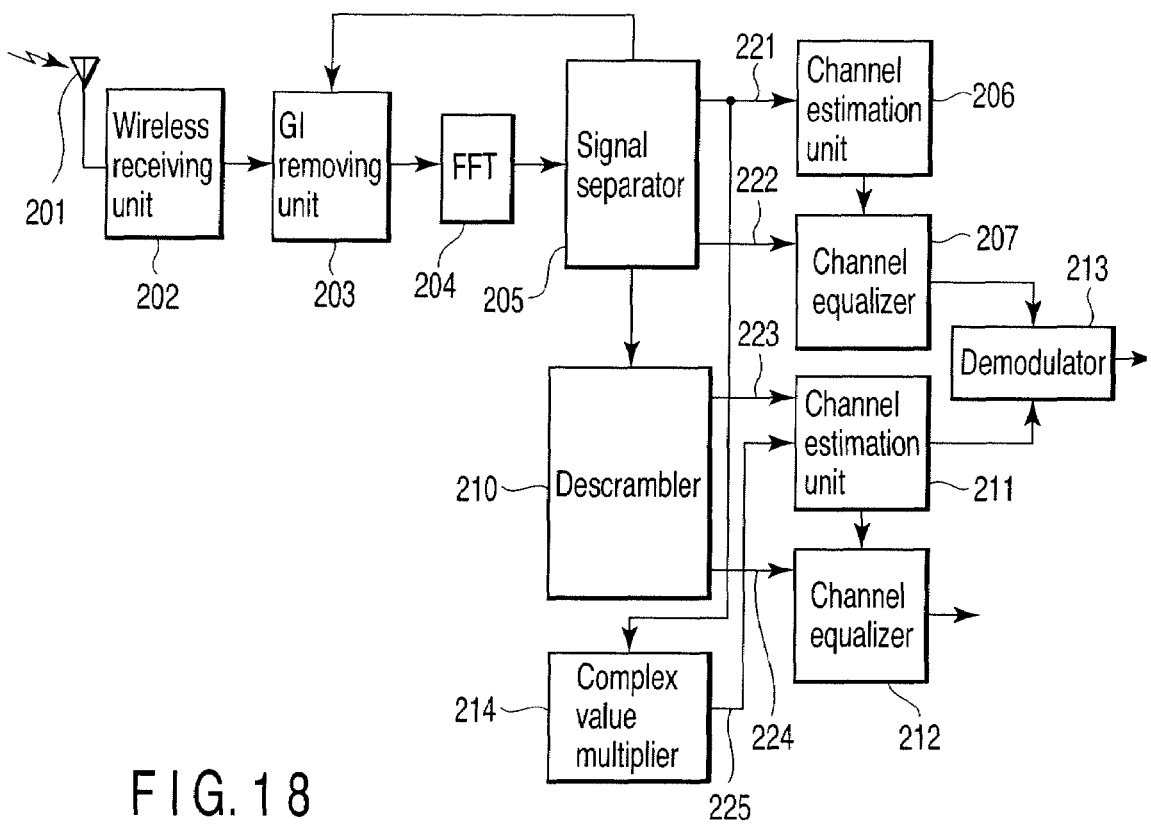
FIG. 18 is a block diagram showing yet another example of the OFDM receiver in FIG. 1.

An example of the contents of data signal allocated to data subcarriers within a subcarrier group will be explained. The OFDM transmitter shown in FIG. 2 or FIG. 5 is a base station for a cellular system (mobile phone system). Explanations will be carried on through the example in which the OFDM receiver shown in FIG. 4, 6 or 18 is a terminal. The base station may form a plurality of sectors. In such case, the base station includes as many OFDM transmitters as the number of sectors. The data signal is used for, such as, broadcast communication, multicast communication or soft handover as follows.

Firstly, examples of carrying out broadcast communication and multicast communication are described. Same data signals are allocated to data subcarriers within the subcarrier group and transmitted from a plurality of base stations. In such case, all terminals connected to the base station are able to receive the same data signals simultaneously. Accordingly, the cellular system is able to perform broadcast communication and multicast communication by utilizing the subcarriers within the subcarrier group. A broadcast communication is referred to as a service to transmit data signals without specifying the user. A multicast communication is referred to as a service to transmit the same data signals to two or more specified terminals. In some cases, the broadcast communication and multicast communication are collectively called the Multimedia Broadcast and Multicast Service (MBMS) communication. Meanwhile, a service to transmit data to one specific terminal is referred to as a unicast.

Accordingly, it may be considered to use broadcast communication and multicast communication for subcarriers within the subcarrier group, and unicast communication for subcarriers outside the subcarrier group. For instance, a streaming of moving image data or music data, and multi-address transmission of e-mail can be cited as an example of transmitting data signals by broadcast communication or multicast communication.

An example of conducting soft handover will be explained. Same data signals are allocated to data subcarriers within the subcarrier group and transmitted from a plurality of base stations. In such case, terminals on the cell borderline are able to receive signals simultaneously from the plurality of base stations bordering the borderline. Accordingly, the cellular system is able to realize the soft handover as follows by utilizing data signals allocated to subcarriers within the subcarrier group.

Firstly, while the terminal exists near the center of the cell of a first base station, it carries out usual reception of data signals allocated to subcarriers outside the subcarrier group set by the first base station. Next, when the terminal comes near the boundary of the cells between the first base station and a second base station adjacent thereto, it performs macro diversity reception of the data signals allocated to subcarriers within each subcarrier group set by the first and second base stations. Subsequently, when the terminal moves to the center area of the cell of the second base station, it performs usual reception of data signals allocated to subcarriers outside the subcarrier group set by the second base station. In such manner, soft handover can be conducted using data signals allocated to a subcarrier group.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The present invention is of service to macro diversity reception for wireless communication systems.

What is claimed is:

1. A method of transmitting orthogonal frequency division multiplexing (OFDM) signals from a plurality of transmitters, comprising:
    allocating first pilot signals, second pilot signals, first data signals, and second data signals to first pilot subcarriers, second pilot subcarriers, first data subcarriers, and second data subcarriers, respectively, the first data signals being identical between the transmitters;
    allocating the first pilot subcarriers and the first data subcarriers to subcarriers included in each subcarrier group of subcarrier groups, each subcarrier group including at least one pilot subcarrier, data signals transmitted via the subcarriers included in each subcarrier group being identical between the transmitters;
    multiplying at least one first pilot signal and first data signals included in one subcarrier group by one of complex numbers for the subcarrier groups to obtain a multiplied first pilot signal and multiplied first data signals, wherein plural complex numbers are set for each respective subcarrier group and for each respective transmitter;
    generating an OFDM signal by performing OFDM modulation on the multiplied first pilot signal and the multiplied first data signals and the second pilot signals and the second data signals; and
    transmitting the OFDM signal, wherein the multiplied first pilot signal, the second pilot signals, the multiplied first data signals, and the second data signals are transmitted by multiple antennas of a plurality of transmitters, each transmitter being part of a multi-diversity system in which each transmitter includes at least one antenna, the subcarrier groups are identical among the transmitters.

2. The method according to claim 1, further comprising:
    scrambling the second pilot signals and the second data signals in accordance with a predetermined scramble pattern, the modulation carried out by performing the OFDM modulation on the multiplied first pilot signal and the multiplied first data signals and the scrambled second pilot signals and the scrambled second data signals.

3. An OFDM transmitter transmitting OFDM signals comprising:
    a first allocator configured to allocate first pilot signals, second pilot signals, first data signals, and second data signals to first pilot subcarriers, second pilot subcarriers, first data subcarriers, and second data subcarriers, respectively, the first data signals being identical between the transmitters;
    a second allocator configured to allocate the first pilot subcarriers and the first data subcarriers included in each subcarrier group of subcarrier groups, each subcarrier group including at least one pilot subcarrier, data signals transmitted via the subcarriers included in each subcarrier group being identical between the transmitters;
    a multiplier configured to multiply at least one first pilot signal and first data signals included in one subcarrier group by one of complex numbers for the subcarrier groups to obtain a multiplied first pilot signal and multiplied first data signals, wherein plural complex numbers are set for each respective subcarrier group and for each respective transmitter;
    a modulator configured to generate an OFDM signal by performing OFDM modulation on the multiplied first pilot signal and the multiplied first data signals and the second pilot signals and the second data signals; and
    a transmitter configured to transmit the generated OFDM signal, wherein the multiplied first pilot signal, the second pilot signals, the multiplied first data signals, and the second data signals are transmitted by multiple antennas of a plurality of transmitters, each transmitter being part of a multi-diversity system in which each transmitter includes at least one antenna, the subcarrier groups being identical among the transmitters.

4. The OFDM transmitter according to claim 3, further comprising:
    a scrambler configured to scramble the second pilot signals and the second data signals in accordance with a predetermined scramble pattern, wherein
    the modulator is configured to perform the OFDM modulation on the multiplied first pilot signal and the multiplied first data signals and the scrambled second pilot signals and the scrambled second data signals.

5. The OFDM transmitter according to claim 3, wherein each of the subcarrier groups includes the first pilot subcarrier and the first data subcarriers arranged within a specific time-frequency domain.

6. The OFDM transmitter according to claim 3, wherein each of the subcarrier groups is configured to include the first pilot subcarrier and the first data subcarriers included in a plurality of successive OFDM symbols.

7. The OFDM transmitter according to claim 3, wherein each of the subcarrier groups is configured to include the first pilot subcarrier and the first data subcarriers arranged within the specific time-frequency domain and the first pilot subcarrier arranged outside the domain in a same position on the frequency axis as at least one of pilot subcarriers or the first data subcarriers within the domain and in a different time axis position.

8. The OFDM transmitter according to claim 3, wherein each of the subcarrier groups is configured to include the first pilot subcarrier and the first data subcarriers included in a plurality of successive OFDM symbols and the first pilot subcarrier having a same frequency as at least one of pilot subcarriers or the first data subcarriers within the plurality of successive OFDM symbols and further included in at least one OFDM symbol close to the plurality of successive OFDM symbols.

9. The OFDM transmitter according to claim 3, wherein a plurality of first pilot subcarriers are dispersed within each of the subcarrier groups.

10. The OFDM transmitter according to claim 3, wherein a plurality of first pilot subcarriers are preferentially arranged on ends of a frequency axis direction within each of the subcarrier groups.

11. The OFDM transmitter according to claim 3, wherein a plurality of pilot subcarriers are preferentially arrange on ends of a time axis direction within each of the subcarrier groups.

12. The OFDM transmitter according to claim 3, wherein the multiplier uses the one of complex numbers in a sequence of complex numbers for the subcarrier groups to establish an orthogonal or pseudo orthogonal relation among the other OFDM transmitters.

13. The OFDM transmitter according to claim 12, wherein a correlation value between the sequence and that used by the other OFDM transmitters is set smaller than an auto-correlation value of the sequence of the complex numbers.

14. The OFDM transmitter according to claim 3, wherein the modulator generates a first OFDM symbol including subcarriers within each of the subcarrier groups and a second OFDM symbol other than the first OFDM symbol by the OFDM modulation to generate the OFDM signal, and is configured to add a first guard interval and a second guard interval respectively to the first OFDM symbol and the second OFDM symbol, the length of at least one of the first guard interval is longer than the second guard interval.

15. The OFDM transmitter according to claim 3, wherein the modulator generates a first OFDM symbol including the first data subcarriers within each of the subcarrier groups and a second OFDM symbol other than the first OFDM symbol by the OFDM modulation to generate the OFDM signal, and is configured to add a first guard interval and a second guard interval respectively to the first OFDM symbol and the second OFDM symbol, and the length of at least one of the first guard interval is longer than the second guard interval.

16. The OFDM transmitter according to claim 3, being used as a base station for a cellular system.

17. A method of transmitting orthogonal frequency division multiplexing (OFDM) signals from a plurality of transmitters, comprising:
    allocating first pilot signals, second pilot signals, first data signals, and second data signals to first pilot subcarriers, second pilot subcarriers, first data subcarriers, and second data subcarriers, respectively, the first data signals being identical between the transmitters;
    allocating the first pilot subcarriers and the first data subcarriers to subcarriers included in each subcarrier group of subcarrier groups, each subcarrier group including at least one pilot subcarrier, data signals transmitted via the subcarriers included in each subcarrier group being identical between the transmitters;
    multiplying at least one first pilot signal and first data signals included in one subcarrier group by one of complex numbers for the subcarrier groups to obtain a multiplied first pilot signal and multiplied first data signals, wherein plural complex numbers are set for each respective subcarrier group and for each respective transmitter;
    generating an OFDM signal by performing OFDM modulation on the multiplied first pilot signal and the multiplied first data signals and the second pilot signals and the second data signals; and
    transmitting the OFDM signal, wherein the multiplied first pilot signal, the second pilot signals, the multiplied first data signals, and the second data signals are transmitted by multiple antennas of a plurality of transmitters, the subcarrier groups are identical among the transmitters, wherein
    the multiplying the at least one first pilot signal and the first data signals uses the one of complex numbers in a sequence of complex numbers for the subcarrier groups to establish an orthogonal or pseudo orthogonal relation among the other OFDM transmitters.

18. The OFDM transmitter according to claim 17, wherein a correlation value between the sequence and that used by the other OFDM transmitters is set smaller than an auto-correlation value of the sequence.

* * * * *